(12) United States Patent
Kimura

(10) Patent No.: US 8,154,230 B2
(45) Date of Patent: Apr. 10, 2012

(54) CHOPPER CONTROL SYSTEM FOR ROTARY MACHINES

(75) Inventor: Tomonori Kimura, Oobu (JP)

(73) Assignee: Denso Corporation, Kariya (JP)

( * ) Notice: Subject to any disclaimer, the term of this patent is extended or adjusted under 35 U.S.C. 154(b) by 485 days.

(21) Appl. No.: 12/369,911

(22) Filed: Feb. 12, 2009

(65) Prior Publication Data

US 2009/0200970 A1 Aug. 13, 2009

(30) Foreign Application Priority Data

Feb. 12, 2008 (JP) .................... 2008-030825

(51) Int. Cl.
*H02P 6/00* (2006.01)

(52) U.S. Cl. .............. 318/400.01; 318/400.3; 318/400.1

(58) Field of Classification Search ............ 318/400.01, 318/400.3, 400.1, 102, 375, 727; 388/830; 323/282

See application file for complete search history.

(56) References Cited

U.S. PATENT DOCUMENTS

| | | | |
|---|---|---|---|
| 7,274,173 B2 | 9/2007 | Inoshita et al. | |
| 2002/0136030 A1 | 9/2002 | Tokunaga et al. | |
| 2004/0085048 A1 | 5/2004 | Tateishi | |
| 2005/0218876 A1 | 10/2005 | Nino | |
| 2006/0076939 A1 | 4/2006 | De Boer | |
| 2010/0291450 A1* | 11/2010 | Aoyagi et al. | ................ 429/429 |

FOREIGN PATENT DOCUMENTS

| | | |
|---|---|---|
| JP | 02-060462 | 2/1990 |
| JP | 2002-354787 | 12/2002 |
| JP | 2004-048830 | 2/2004 |
| JP | 2005-295671 | 10/2005 |
| JP | 2006-136125 | 5/2006 |
| JP | 2006-174653 | 6/2006 |
| JP | 2006-516875 | 7/2006 |

OTHER PUBLICATIONS

Japanese Office Action dated Jan. 6, 2010, issued in corresponding Japanese Application No. 2008-030825, with English translation.

* cited by examiner

*Primary Examiner* — Karen Masih
(74) *Attorney, Agent, or Firm* — Nixon & Vanderhye P.C.

(57) ABSTRACT

A control apparatus is to drive a power converter. The power converter has a power supply unit, a switching member electrically connected to the power supply unit, and a power accumulator electrically connected to the switching member. The control apparatus controls a rotary machine with a terminal electrically connected to the power accumulator. A calculator calculates, based on a command voltage to the rotary machine, a command value for an output current to the power accumulator and the rotary machine. A chopper control unit carries out chopper control of the power converter by switching on and off the switching member based on the command value for the output current to thereby convert a voltage across the power accumulator into a desired voltage relation to a voltage of the power supply unit.

25 Claims, 17 Drawing Sheets

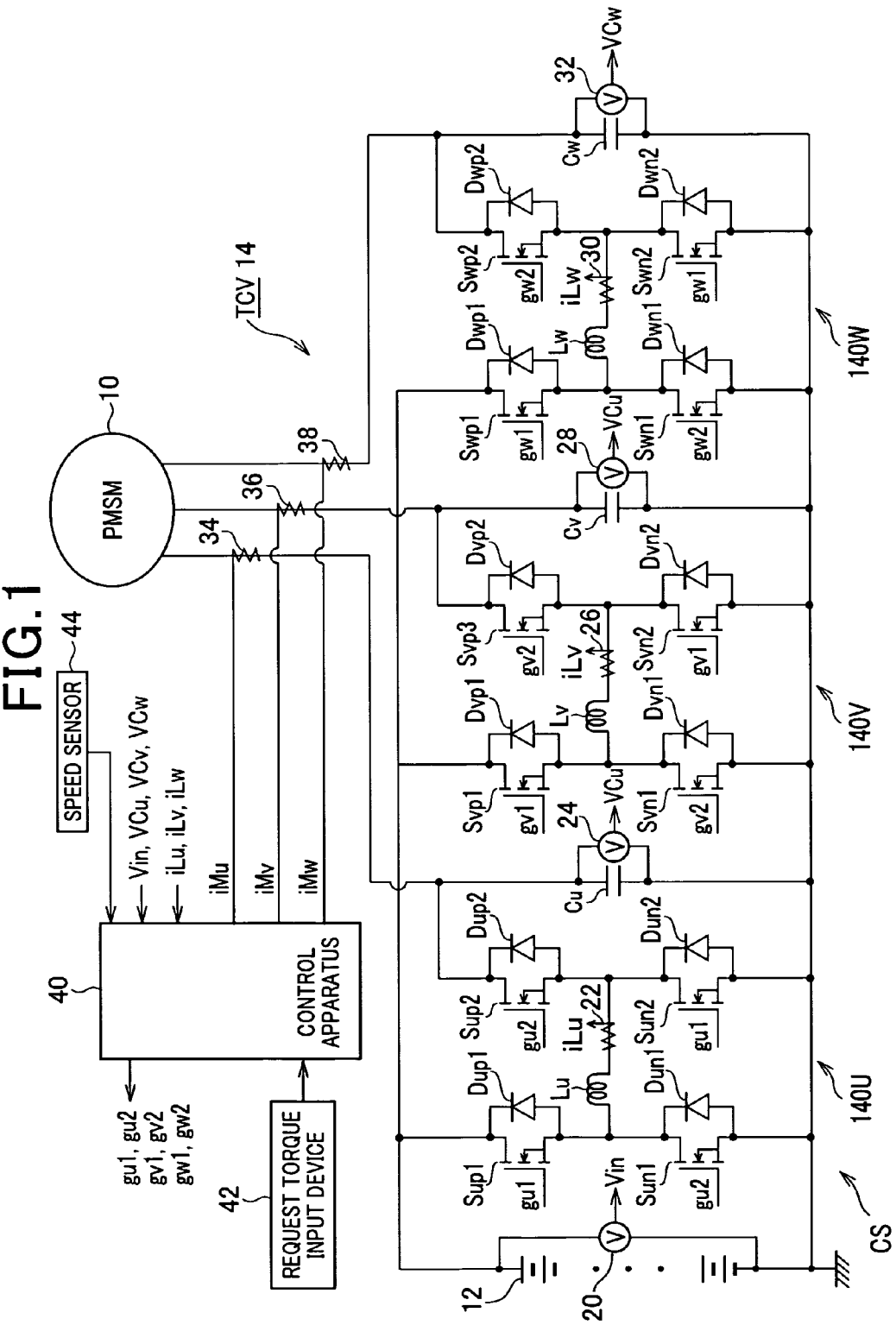

$tup = 2 \cdot L \cdot iCuc \cdot (Vin+VCu)/(Vin \cdot Vin)$ $tun = 2 \cdot L \cdot (-iCuc) \cdot (Vin+VCu)/(Vin \cdot VCu)$

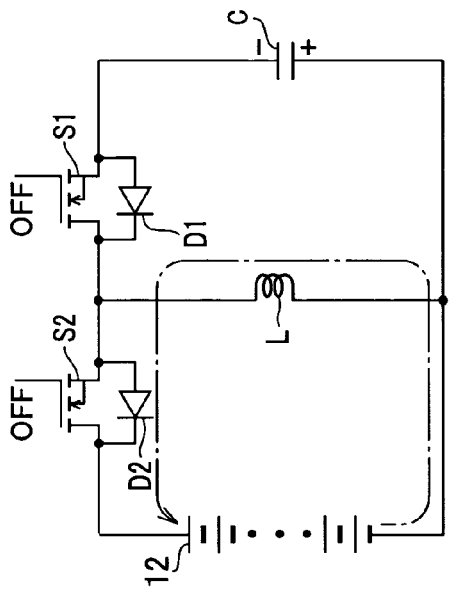
FIG.9B
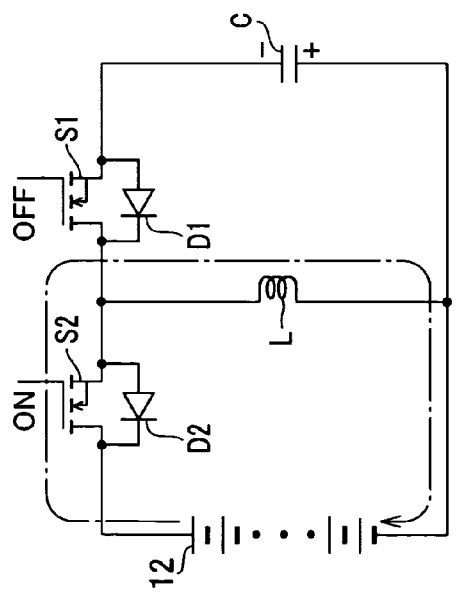
FIG.9D
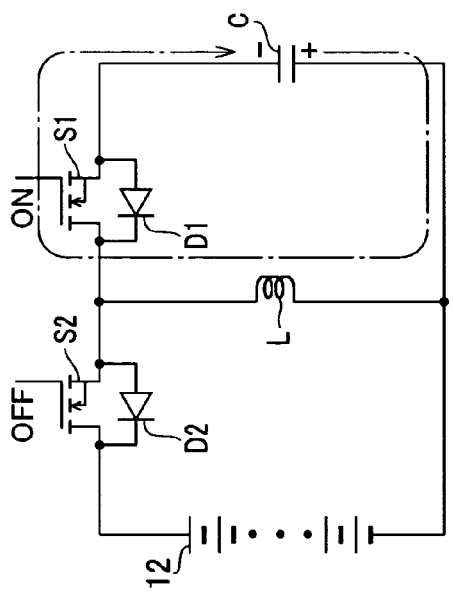
FIG.9A
FIG.9C $tup = 2 \cdot L \cdot iCuc / (Vin - VCu)$ $tun = 2 \cdot L \cdot (-iCuc) / VCu$

CHOPPER CONTROL SYSTEM FOR ROTARY MACHINES

CROSS REFERENCE TO RELATED APPLICATIONS

This application is based on Japanese Patent Application 2008-030825 filed on Feb. 12, 2008. This application claims the benefit of priority from the Japanese patent application, so that the descriptions of which are all incorporated herein by reference.

FIELD OF THE INVENTION

The present invention relates to control systems for rotary machines; these control systems are designed to carry out chopper control of a power converter to thereby control a rotary machine.

BACKGROUND OF THE INVENTION

A technique for driving a switching element of an inverter by comparing a command voltage for a rotary machine with a carrier wave is commonly used. The technique allows a pseudo sinusoidal command voltage to be applied to a terminal of the rotary machine.

The technique however may cause an output voltage of the inverter to binarily fluctuate. This may highly change a voltage at a neutral point of the rotary machine, resulting in that common-mode noise may occur and/or surge voltages may increase.

In order to address such disadvantages, a control system is disclosed in U.S. Pat. No. 7,274,173 corresponding to Japanese Patent Application Publication No. 2006-136125.

The control system disclosed in the US patent provides a control system for a three-phase rotary machine. The control system is designed to convert a voltage across a capacitor of a DC (Direct Current) to DC converter into a desired voltage relation to a power supply voltage to the DC to DC converter.

The control system is also designed such that a terminal of each phase of the three-phase rotary machine is electrically connected across the capacitor of the DC to DC converter. With the configuration of the control system disclosed in the US patent, a substantially sinusoidal voltage is applied to each phase of the three-phase rotary machine, thus reducing surge voltages.

SUMMARY OF THE INVENTION

The control system disclosed in the US patent is designed to usage an output DC voltage of the DC to DC converter to thereby apply an AC (Alternating Current) voltage to the three-phase rotary machine. Because the DC to DC converter is designed to output a DC voltage, it may be difficult for the control system to apply a desired voltage to a three-phase rotary machine when:

applying an AC voltage to the three-phase rotary machine, causing an AC current to flow in the three-phase rotary machine, and/or rapidly changing a torque to be created by the three-phase rotary machine.

Accordingly, an object of at least one aspect of the present invention is to provide control apparatuses specifically designed to control a power converter that converts, with chopper control, a voltage across a power accumulating unit electrically connected to a terminal of a rotary electric machine into a desired voltage relation to a voltage of a power supply unit, thus variably controlling a voltage to be applied to the rotary machine.

Additionally, another object of another aspect of the present invention is to provide control systems each with such a specific designed control apparatus.

According to one aspect of the present invention, there is provided a control apparatus for driving a power converter. The power converter has a power supply unit, a switching member electrically connected to the power supply unit, and a power accumulator electrically connected to the switching member. The control apparatus controls a rotary machine with a terminal electrically connected to the power accumulator. The control system includes a calculator configured to calculate, based on a command voltage to the rotary machine, a command value for an output current to the power accumulator and the rotary machine. The control apparatus includes a chopper control unit configured to carry out chopper control of the power converter by switching on and off the switching member based on the command value for the output current to thereby convert a voltage across the power accumulator into a desired voltage relation to a voltage of the power supply unit.

In the control apparatus according to the one aspect of the present invention, because the power accumulator is electrically connected to the terminal of the rotary machine, a voltage of the power accumulator is applied to the terminal of the rotary machine. For this reason, it is desired to control the voltage of the power accumulator based on a command voltage to the rotary machine.

With the configuration of the control apparatus according to the one aspect of the present invention, in order to calculate an output current to the power accumulator and the rotary machine, a command value for the output current required when the voltage of the power accumulator is controlled based on the command voltage is grasped. This makes possible that the voltage of the power accumulator to be applied to the rotary machine is properly controlled based on the grasped command value for the output current. For this reason, it is possible to properly control the voltage to be applied to the rotary machine.

Note that the output current to the power accumulator and the rotary machine can include an output current from a circuit to the power accumulator.

According to another aspect of the present invention, there is provided a control apparatus for driving a power converter. The power converter has a power supply unit, a switching member electrically connected to the power supply unit, and a power accumulator electrically connected to the switching member. The control apparatus controls a rotary machine with a terminal electrically connected to the power accumulator. The control apparatus includes a grasping unit configured to grasp an amount of charges to be transferred between the rotary machine and the power converter. The control apparatus includes a chopper control unit configured to carry out chopper control of the power converter by switching on and off the switching member based on a command voltage to the rotary machine and the grasped amount of charges to thereby convert a voltage across the power accumulator into a desired voltage relation to a voltage of the power supply unit.

In the control apparatus according to another aspect of the present invention, in order to control a voltage across the power accumulator based on a command voltage, the amount of charges to be transferred between the rotary machine and the power converter may be disturbance factors. For this reason, even if the voltage of the power accumulator is increased, it is not necessarily supply charges to the power accumulator and the rotary machine. Thus, based on a current flowing through the terminal of the rotary machine, it may be necessary to remove charges from the power accumulator and the rotary machine.

In view of the circumstances set forth above, with the configuration of the control apparatus according to another aspect of the present invention, the amount of charges to be transferred between the power converter and the rotary machine is grasped. This makes possible that the voltage of the power accumulator to be applied to the rotary machine is properly controlled based on the grasped amount of charges to be transferred between the power converter and the rotary machine. For this reason, it is possible to properly control the voltage to be applied to the rotary machine.

According to a further aspect of the present invention, there is provided a control system including the power converter according to the one aspect of the present invention; and the control apparatus according to the one aspect of the present invention.

According to a still further aspect of the present invention, there is provided a control system including the power converter according to another aspect of the present invention; and the control apparatus according to another aspect of the present invention.

BRIEF DESCRIPTION OF THE DRAWINGS

Other objects and aspects of the invention will become apparent from the following description of embodiments with reference to the accompanying drawings in which:

FIG. 1 is a circuit diagram of a control system according to the first embodiment of the present invention;

FIG. 9A is a circuit diagram schematically illustrating chopper control in the first mode upon the drive signal ga1 being on according to the second embodiment;

FIG. 9B is a circuit diagram schematically illustrating the chopper control in the first mode upon the drive signal gu1 being off according to the second embodiment;

FIG. 9C is a circuit diagram schematically illustrating chopper control in the second mode upon drive signal gu2 being on according to the second embodiment;

FIG. 9D is a circuit diagram schematically illustrating the chopper control in the first mode upon the drive signal gu2 being off according to the second embodiment;

DETAILED DESCRIPTION OF EMBODIMENTS OF THE INVENTION

Figure 2B:
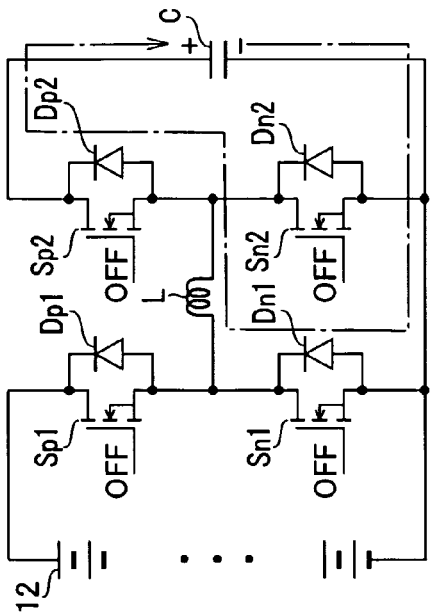
FIG. 2B is a circuit diagram schematically illustrating the chopper control in the first mode upon the drive signal gu1 being off according to the first embodiment.

Embodiments of the present invention will be described hereinafter with reference to the accompanying drawings. In each of the embodiments, the present invention is, for example, applied to a control system for a motor serving as a power generator for a hybrid vehicle.

Referring to the drawings, in which like reference characters refer to like parts in several figures, particularly to FIG. 1, there is illustrated a motor 10 serving as a power generator installed in a hybrid vehicle. As the motor 10, a permanent magnet synchronous motor (PMSM) is for example used in the first embodiment.

In FIG. 1, there is also illustrated a control system CS equipped with: a three-phase converter (TCV) 14 serving as a power converter, a high-voltage battery 12, and a control apparatus 40. Specifically, the motor 10 is electrically connected to the high-voltage battery 12 via the TCV 14. The high-voltage battery 12 is for example a nickel hydrogen battery or a lithium battery.

For example, the motor 10 is provided with an annular rotor having a rotor core. The rotor core of the rotor is provided at its circumferential portion with at least one N and S permanent-magnet pole pair. The rotor has a direct axis (d-axis) in line with a rotor N pole center line, and has a quadrature axis (q-axis) whose phase is π/2 radian electric angle leading with respect to a corresponding d-axis during rotation of the rotor.

The stator includes a stator core with, for example, an annular shape in its lateral cross section. The stator core is for example disposed around the outer periphery of the rotor core such that the inner periphery of the stator core is opposite to the outer periphery of the rotor core with a predetermined air gap.

The stator core also has a plurality of slots. The slots are formed through the stator core and are circumferentially arranged at given intervals. The stator also includes a set of three-phase windings wound in the slots of the stator.

The three-phase windings are wound in the slots such that the U-phase winding, V-phase winding, and W-phase winding are shifted by an electrical angular position of, for example, 2π/3 radian in phase from each other.

The motor 10 is operative to receive at its three-phase windings three-phase currents to thereby generate a rotating magnetic flux; this allows the rotor to turn based on magnetic attractive force between the rotating magnetic flux and a magnetic flux of the rotor.

One ends of the and W-phase windings are connected to each other in, for example, star configuration to constitute an individual neutral point.

The TCV 14 is provided with, for example, a DC to DC converter for each phase of the motor 10 to be electrically connected to each phase winding of the motor 10. The TCV 14 for each phase of the motor 10 is operative to continuously adjust a voltage across a corresponding phase winding of the motor 10.

Specifically, the TCV 14 for each phase is provided with, for example, a non-inverting back-boost converter 140.

The non-inverting back-boost converter 140 for U-phase, referred to as "DC to DC converter 140U", consists of a set of series-connected switching elements Sup1 and Sun1, a capacitor Cu, a set of series-connected switching elements Sup2 and Sun2, and a coil Lu.

The set of series-connected switching elements Sup1 and Sun1 is electrically connected in parallel to the high-voltage battery 12. The capacitor Cu is electrically connected between one terminal of the U-phase winding of the motor 10 and a signal ground to which a negative electrode of the high-voltage battery 12 is connected.

The set of series-connected switching elements Sup2 and Sun2 is electrically connected in parallel to the capacitor Cu. The coil Lu is placed to electrically connect between:

a connecting point between the series-connected switching elements Sup1 and Sun1; and a connecting point between the series-connected switching elements Sup2 and Sun2.

In the first embodiment, as each of the switching elements Sup1, Sun1, Sup2, and Sun2, a power MOSFET is used.

The DC to DC converter 140U includes diodes Dup1, Dun1, Dup2, and Dun2 electrically connected in antiparallel to the switching elements Sup1, Sun1, Sup2, and Sun2, respectively.

Because a power MOSFET is used as each of the switching elements Sup1, Sun1, Sup2, and Sun2, a power MOSFET, the intrinsic diodes (body diodes) of the power MOSFETs can serve as the diodes Dup1, Dun1, Dup2, and Dun2, respectively.

More specifically, the source of the switching element Sup1 and the drain of the switching element Sun1 are commonly connected to each other at the connecting point. The drain of the switching element Sup1 is electrically connected to a positive electrode of the high-voltage battery 12, and the source of the switching element Sun1 is electrically connected to the signal ground.

The source of the switching element Sup2 and the drain of the switching element Sun2 are also commonly connected to each other at the connecting point. The drain of the switching element Sup2 is electrically connected to the positive electrode of the high-voltage battery 12, and the source of the switching element Sun2 is electrically connected to the signal ground.

Similarly, the non-inverting back-boost converter 140 for V-phase, referred to as "DC to DC converter 140V", consists of a set of series-connected switching elements Svp1 and Svn1, a capacitor Cv, a set of series-connected switching elements Svp2 and Svn2, a coil Lv, and diodes Dvp1, Dvn1, Dvp2, and Dvn2. In addition, the non-inverting back-boost converter 140 for W-phase, referred to as "DC to DC converter 140W", consists of a set of series-connected switching elements Swp1 and Swn1, a capacitor Cw, a set of series-connected switching elements Swp2 and Swn2, and a coil Lw. The circuit configuration of each of the DC to DC converters 140V and 140W is identical to that of the DC to DC converter 140U so that like reference characters refer to like parts in FIG. 1.

In addition, the control system CS is equipped, as means for its measuring various internal states, with a voltage sensor 20, a current sensor 22, a voltage sensor 24, a current sensor 26, a voltage sensor 28, a current sensor 30, and a voltage sensor 32.

The voltage sensor 20 is electrically connected across the high-voltage battery 12 and operative to measure a voltage thereacross. The current sensor 22 is electrically connected in series to the coil Lu and operative to measure a current flowing through the coil Lu.

The voltage sensor 24 is electrically connected across the capacitor Cu and operative to measure a voltage thereacross. The current sensor 26 is electrically connected in series to the coil Lv and operative to measure a current flowing through the coil Lv.

The voltage sensor 28 is electrically connected across the capacitor Cv and operative to measure a voltage thereacross. The current sensor 30 is electrically connected in series to the coil Lw and operative to measure a current flowing through the coil Lw.

The voltage sensor 32 is electrically connected across the capacitor Cw and operative to measure a voltage thereacross.

The control system CS is equipped, as means for measuring various internal states of the motor 10, with current sensors 34, 36, and 38.

The current sensor 34 is located to measure a current flowing through the U-phase winding of the motor 10. Similarly, each of the current sensors 36 and 38 is located to measure a current flowing through a corresponding one of the V-phase and W-phase windings of the motor 10.

The control apparatus 40 is electrically connected to a request torque input device 42 installed in the hybrid vehicle. The request torque input device 42 is operative to input, to the control apparatus 40, a commanded torque (request torque) of a user, such as an acceleration command of the user.

For example, an accelerator position sensor installed in the hybrid vehicle can be used as the request torque input device 42. Specifically, the accelerator position sensor is operative to sense an actual position of an accelerator pedal of the hybrid vehicle operable by the driver and to send, as data representing a request torque of the driver, the sensed actual position of the accelerator pedal to the control apparatus 40. The data representing a variable request torque will be referred to as "request torque data" hereinafter.

The control apparatus 40 is electrically connected to a rotational speed sensor (or a rotational position sensor) 44 installed in the hybrid vehicle. The rotational speed sensor 44 is arranged close to the rotor of the motor 10 and is operative to measure an actual rotational speed ω of the d-axis of the rotor with respect to a stator coordinate system fixed in space which characterizes the three-phase windings of the stator. The rotational speed sensor 44 is operative to send, to the control apparatus 40, the measured actual rotational speed of the rotor of the motor 10.

The control apparatus 40 is electrically connected to each of the switching elements Sup1, Sun1, Sup2, Sun2, Svp1, Svn1, Svp2, Svn2, Swp1, Swn1, Swp2, and Swn2. The control apparatus 40 is designed to control the motor 10, and operative to receive measured values from the respective sensors 20, 22, 24, 26, 28, 30, 32, 34, 36, and 38 and the request torque data, and to drive the TCV 14 based on the received measured values, request torque data, and actual rotational speed of the motor 10. The control apparatus 40 can be designed as a computer circuit with a driver for driving the TCV 14.

Specifically, the control apparatus 40 is operative to generate:

a drive signal gu1 for driving the switching elements Sup1 and Sun2;

a drive signal gu2 for driving the switching elements Sun1 and Sup2;

a drive signal gv1 for driving the switching elements Svp1 and Svn2;

a drive signal gv2 for driving the switching elements Svn1 and Svp2;

a drive signal gw1 for driving the switching elements Swp1 and Swn2; and a drive signal gw2 for driving the switching elements Swn1 and Swp2.

Each of the drive signals gu1, gu2, gv1, gv2, gw1, and gw2 is a pulse signal with a controllable on duration (pulse width).

Specifically, the control apparatus 40 is operative to carry out chopper control of the TCV 14 based on the individual on durations of the drive signals gu1, gu2, gv1, gv2, gw1 and gw2 to thereby convert the voltage across the high-voltage battery 12 into the voltages across the capacitors Cu, Cv, and Cw, respectively.

FIGS. 2A to 2D schematically illustrate various modes of the chopper control according to the first embodiment.

Note that, in FIGS. 2A to 2D, one of the DC to DC converters constituting the TCV 14 is illustrated, and reference characters from which alpha characters corresponding to any one phase are eliminated are assigned to the elements of one of the DC to DC converters.

For example, switching elements Sup1, Svp1, Swp1 are each represented by common reference character Sp1 in FIGS. 2A to 2D.

In addition, note that, in FIGS. 2A to 2D, it is assumed that in- and outflow of charges between the capacitor C and the one terminal of a corresponding phase winding of the motor 10 are so low as to be insignificant.

The first mode of the chopper control for supplying charges to the capacitor C and motor 10 will be described hereinafter with reference to FIGS. 2A and 2B.

Figure 2D:
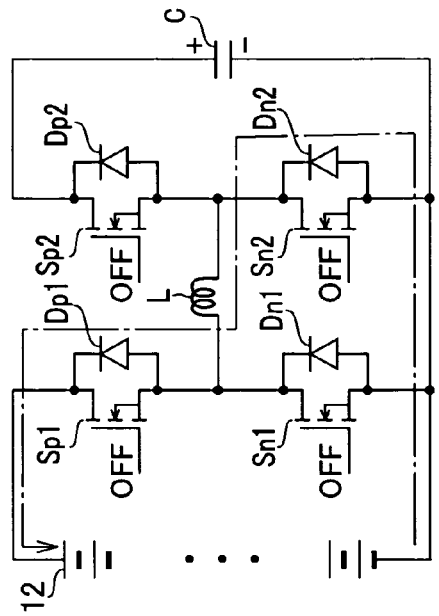
FIG. 2D is a circuit diagram schematically illustrating the chopper control in the first mode upon the drive signal gu2 being off according to the first embodiment.
Figure 2A:
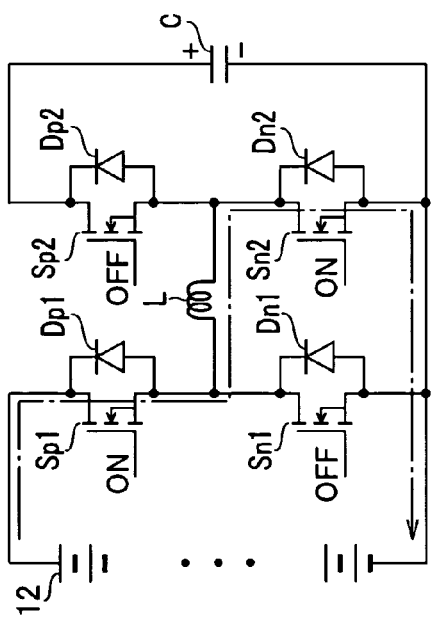
FIG. 2A is a circuit diagram schematically illustrating chopper control in the first mode upon drive signal gu1 being on according to the first embodiment.

When the switching elements Sp1 and Sn2 are switched on in response to the rising of the drive signal gu1, a current flows through a closed loop circuit consisting of the high-voltage battery 12, the switching element Sp1, the coil L, and the switching element Sn2 (see the dashed arrow in FIG. 2A). This applies a voltage across the coil L so that electromagnetic energy is charged in the coil L.

Thereafter, when the switching elements Sp1 and Sn2 are switched off in response to the falling of the drive signal gu1, the electromagnetic energy stored in the coil L is discharged therefrom as electrical energy. In other words, a back electromotive force based on the electromagnetic energy stored in the coil L causes a current to flow through a closed loop circuit consisting of the coil L, the diode Dp2, the capacitor C, and the diode Dn1 (see the dashed arrow in FIG. 2B). This charges the capacitor C.

Next, the second mode of the chopper control for removing charges from the capacitor C and motor 10 will be described hereinafter with reference to FIGS. 2C and 2D.

Figure 2C:
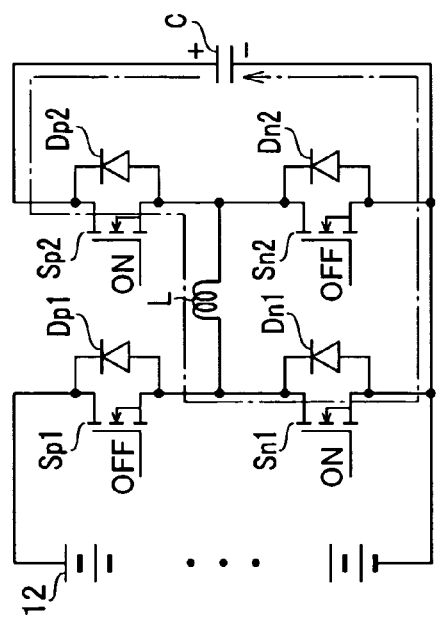
FIG. 2C is a circuit diagram schematically illustrating chopper control in the second mode upon drive signal gu2 being on according to the first embodiment.

When the switching elements Sp2 and Sn1 are switched on in response to the rising of the drive signal gu2, the capacitor C discharges to thereby cause a current to flow through a closed loop circuit consisting of the capacitor C, the switching element Sp2, the coil L, and the switching element Sn1 (see the dashed arrow in FIG. 2C).

This applies a voltage across the coil L so that electromagnetic energy is charged in the coil L.

Thereafter, when the switching elements Sp2 and Sn1 are switched off in response to the falling of the drive signal gu2, the electromagnetic energy stored in the coil L is discharged therefrom as electrical energy. In other words, a back electromotive force based on the electromagnetic energy stored in the coil L causes a current to flow through a closed loop circuit consisting of the coil L, the diode Dp1, the high-voltage battery 12, and the diode Dn2 (see the dashed arrow in FIG. 2D).

The chopper control in the first and second modes for each phase of the motor 10 converts the voltage across the DC power source (the high-voltage battery 12) into a desired analog voltage value to thereby output it to a corresponding one of the phase winding of the motor 10. In other words, the chopper control in the first and second modes for each phase of the motor 10 adjusts the voltage across the capacitor C to a desired analog voltage value so that the desired analog voltage is applied to a corresponding one of the phase winding of the motor 10.

Actually, in- and outflow of charges between the capacitor C and the motor 10 may cause the increase and decrease in the voltage across the capacitor C to be mismatched with the supply of charges to the capacitor C and the motor 10 and the remove of charges therefrom, respectively.

In order to address such mismatching, the control apparatus 40 works to generate the drive signals gu1, gu2, gv1, gv2, gw1, and gw2 each of which individually has a proper on duration (a proper pulse width) to thereby properly control the voltage across the capacitor C irrespective of in- and outflow of charges between the capacitor C and the motor 10.

Figure 3:
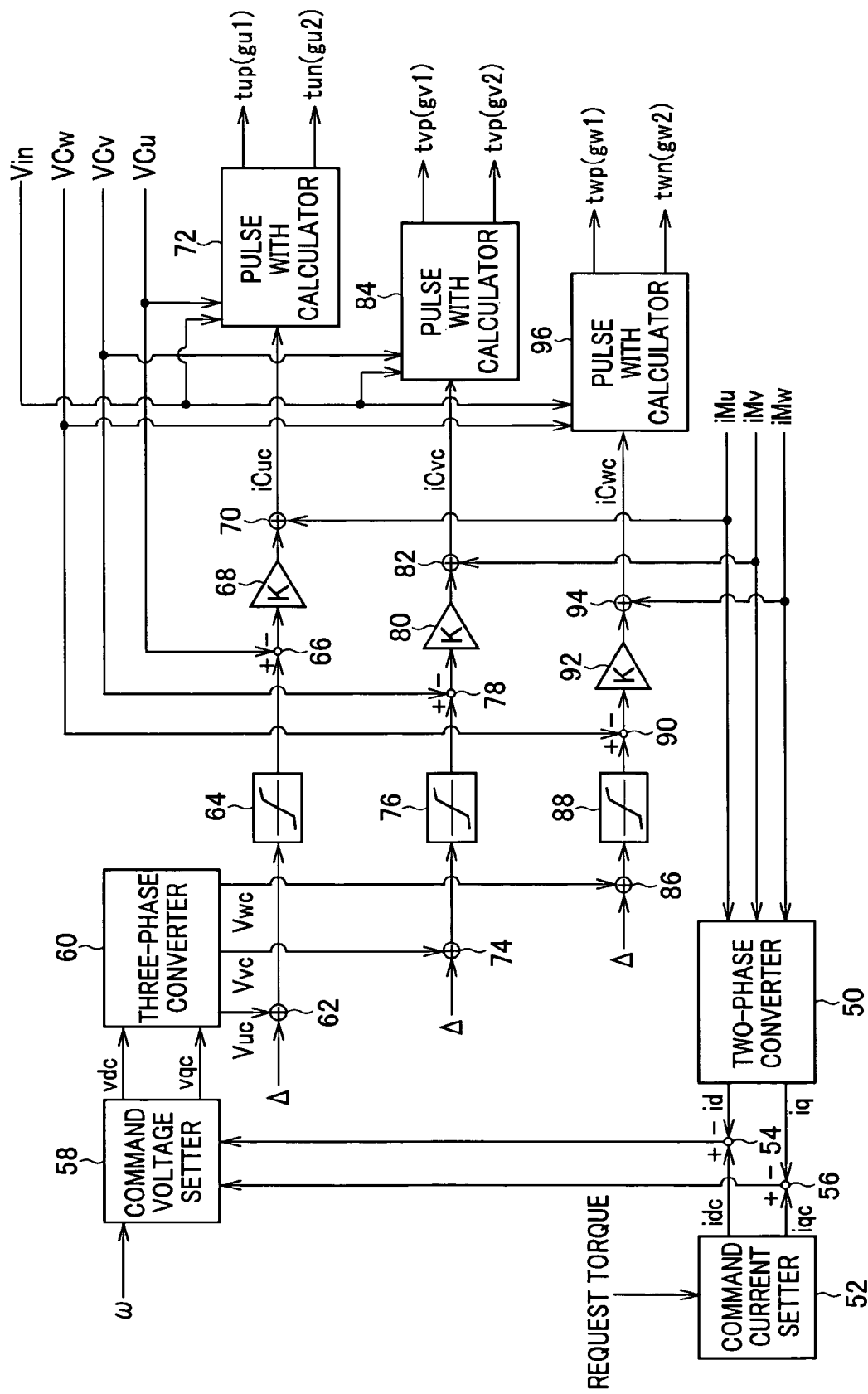
FIG. 3 is a block diagram schematically illustrating functional modules of a control apparatus illustrated in FIG. 1 according to the first embodiment.

FIG. 3 schematically illustrates functional modules of the control apparatus 40 required to generate the drive signals gu1, gu2, gv1, gv2, gw1, and gw2 according to the first embodiment; these functional modules are equivalent to tasks to be executed by the control apparatus 40.

Referring to FIG. 3, the control apparatus 40 includes a two-phase converter 50, a command current setter 52, a deviation calculator 54, a deviation calculator 56, a command voltage setter 58, and a three-phase converter 60.

The control apparatus 40 includes, for U-phase, an offset corrector 62, a guard processor 64, a deviation calculator 66, a feedback controller 68, a feedforward corrector 70, and a pulse width calculator 72.

In addition, the control apparatus 40 includes, for V-phase, an offset corrector 74, a guard processor 76, a subtractor 78, a feedback controller 80, a feedforward corrector 82, and a pulse width calculator 84.

The control apparatus 40 further includes, for W-phase, an offset corrector 86, a guard processor 88, a subtractor 90, a feedback controller 92, a feedforward corrector 94, and a pulse width calculator 96.

Three-phase current values iMu, iMv, and iMw of the three-phase windings of the motor 10 measured by the current sensors 34, 36, and 38 are inputted to the two-phase converter 50. The two-phase converter 50 converts the three-phase current values iMu, iMv, and iMw in the three-phase stator coordinate system of the motor 10 into actual d-axis current component id and q-axis current component iq in the d and q axes of the rotor of the motor 10.

On the other hand, to the command current setter 52, the request torque data is inputted. The command current setter 52 sets command d-axis current component idc and q-axis current component iqc in the d and q axes of the rotor based on the request torque data. The command d-axis current component idc and q-axis current component iqc in the d and q axes correspond to three-phase request currents; these three-phase request currents are required to generate the request torque.

The deviation calculator 54 calculates a deviation Δid between the command d-axis current component idc and the actual d-axis current component id. The deviation calculator 56 calculates a deviation Δiq between the command q-axis current component iqc and the actual q-axis current component iq.

The command voltage setter 58 sets, based on the deviation calculated by the deviation calculator 54, a command voltage vdc in the d-axis; this command voltage vdc allows the command d-axis current component idc to be matched with the measured actual d-axis current component id.

The command voltage setter 58 also sets, based on the deviation calculated by the deviation calculator 56, a command voltage vqc in the q-axis; this command voltage vqc allows the command q-axis current component iqc to be matched with the measured actual q-axis current component iq.

Specifically, in the first embodiment, the command voltage setter 58 computes the command voltages vdc and vqc using a proportional gain term and an integral gain term of a proportional integral feedback algorithm and an interacting term.

In the proportional integral feedback algorithm, each of the command voltages vdc and vqc is expressed based on the proportional gain term and integral gain term.

The proportional gain term for each of the command voltages vdc and vqc contributes to change in a corresponding one of the command voltages vdc and vqc in proportion to a corresponding one of the temporal deviations Δid and Δiq. The integral gain term is proportional to an accumulated offset of instantaneous values of each of the temporal deviations Δid and Δiq over time to reset the accumulated offset (steady-state deviation) over time to zero.

In addition, the command voltage setter 58 carries out non-interacting control of the command voltages vdc and vqc based on the actual rotational speed ω of the motor 10 to calculate the interacting term between d-axis voltage component and q-axis voltage component.

The three-phase converter 60 converts the command voltages vdc and vqc in the d-axis and q-axis into U-phase command voltage Vuc, a V-phase command voltage Vvc, and a W-phase command voltage Vwc for the respective U-, V-, and W-phase windings of the motor 10. The U-, V-, and W-phase command voltages Vuc, Vuc, and Vwc correspond to alternating current (AC) signals with their center amplitude being zero volts. For example, sinusoidal signals are used as the AC signals.

The offset corrector 62 corrects the U-phase command voltage Vuc by adding an offset voltage Δ to the U-phase command voltage Vuc. This correction allows the polarity of the voltage across the capacitor Cu to be fixed to a preset polarity, such as the positive polarity, on the condition that the U-phase command voltage Vuc has the center amplitude of zero volts.

Figure 4:
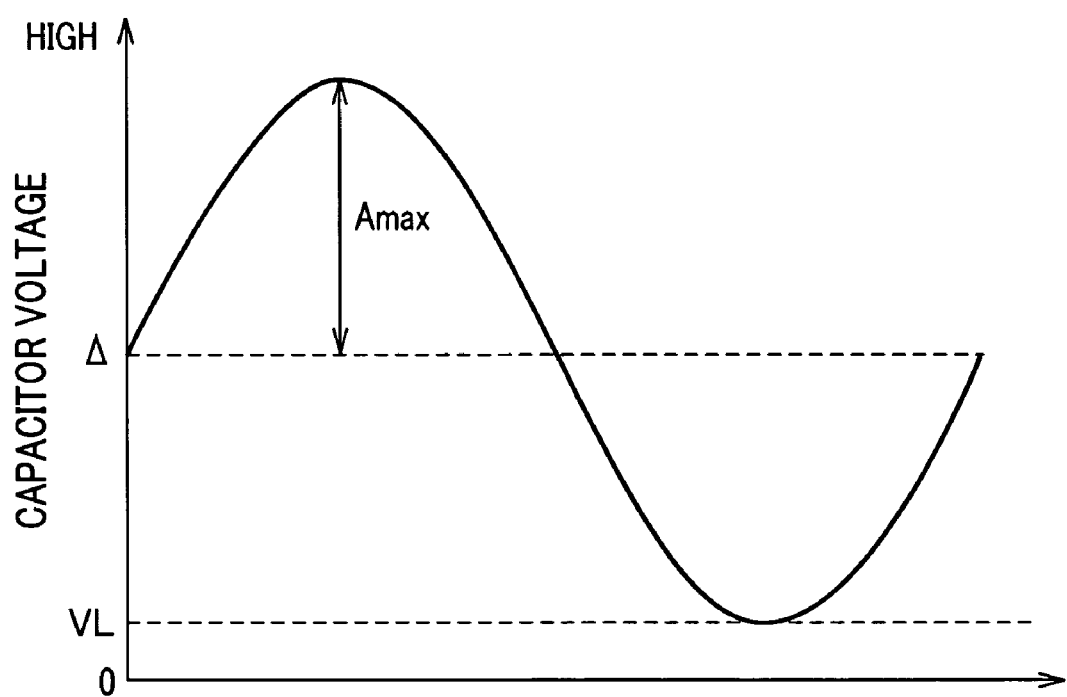
FIG. 4 is a graph schematically illustrating an offset-corrected U-phase command voltage according to the first embodiment.

Specifically, as illustrated in FIG. 4, the correction of the U-phase command voltage Vuc allows the U-phase command voltage Vuc to oscillate about the offset voltage Δ.

Note that, when the polarity of the voltage across the capacitor Cu is merely fixed to the positive polarity, it is sufficient to set the offset voltage Δ to be equal to or higher than an allowed maximum amplitude level Amax of the U-phase command voltage Vuc. However, in the first embodiment, the offset voltage Δ is set to be higher than the allowed maximum amplitude level Amax of the U-phase command voltage Vuc by a preset level VL. This allows the velocity in the U-phase current to be equal to or higher than a preset velocity based on the fact that the variation in the U-phase current depends on only the voltage across the capacitor Cu and the voltage across the high-voltage battery 12.

The U-phase command voltage Vuc corrected by the offset corrector 62 is inputted to the guard processor 64.

The guard processor 64 applies a guard process to the U-phase command voltage Vuc to thereby output a corrected U-phase command voltage Vuc' so as to prevent:

a voltage higher than a corresponding rated voltage from being applied to any element of the DC to DC converter 140U; and the coil Lu from being in saturation.

The corrected U-phase command voltage Vuc' outputted from the guard processor 64 is inputted to the deviation calculator 66.

The deviation calculator 66 calculates a deviation between the corrected U-phase command voltage Vuc' and a U-phase voltage value VCu across the capacitor Cu actually measured by the voltage sensor 24 by subtracting the U-phase voltage value VCu across the capacitor Cu from the corrected U-phase command voltage Vuc'. The deviation between the corrected U-phase command voltage Vuc' and the actually measured U-phase voltage value VCu across the capacitor Cu is inputted to the feedback controller 68.

The feedback controller 68 carries out proportional control of the deviation inputted from the deviation calculator 66 using a proportional gain term with a proportional gain K of a proportional feedback algorithm to thereby calculate a provisional U-phase current value.

In the proportional feedback algorithm, the provisional U-phase current value is expressed based on the proportional gain term.

The proportional gain term with the proportional gain K of the provisional U-phase current contributes to change in the provisional U-phase current in proportion to the deviation inputted from the deviation calculator 66. Specifically, the proportional gain K can be set based on a capacitance of the capacitor Cu and a required rate of change in the voltage across the capacitor Cu.

The provisional U-phase current value outputted from the feedback controller 68 is inputted to the feedforward controller 70.

The feedforward controller 70 adds the U-phase current value iMu measured by the current sensor 34 to the provisional U-phase current value outputted from the feedback controller 68 to thereby calculate a U-phase command current value iCuc. The U-phase command current value iCu means a command current value representing the sum of the amount of current to be supplied to the capacitor Cu and the amount of current to be supplied to the U-phase winding of the motor 10. The U-phase command current value iCuc outputted from the feedforward controller 70 is inputted to the pulse width calculator 72.

The pulse width calculator 72 calculates an on duration (pulse width) of the drive signal gu1 and that of the drive signal gu2 based on: the U-phase command current value iCuc, the actual voltage value Via across the high-voltage battery 12 measured by the voltage sensor 20, and the actual voltage value VCu across the capacitor Cu. The drive signals gu1 and gu2 respectively having their controlled on durations (pulse widths) control the switching elements Sup1, Sun1, Sup2, and Sun2 to thereby match an output current through the capacitor Cu and toward the U-phase winding of the motor 10 with the U-phase command current value iCuc.

As well as the U-phase command voltage Vuc, the V-phase command voltage Vvc corrected by the offset corrector 62 is inputted to the guard processor 76.

The guard processor 76 applies a guard process to the V-phase command voltage Vvc to thereby output a corrected V-phase command voltage Vvc' so as to prevent:

a voltage higher than a corresponding rated voltage from being applied to any element of the DC to DC converter 140V; and the coil Lv from being in saturation.

The corrected V-phase command voltage Vvc' outputted from the guard processor 76 is inputted to the deviation calculator 78.

The deviation calculator 78 calculates a deviation between the corrected V-phase command voltage Vvc' and a V-phase voltage value VCu actually measured by the voltage sensor 28 by subtracting the V-phase voltage value VCv from the corrected V-phase command voltage Vvc'. The deviation between the corrected V-phase command voltage Vvc' and the actually measured V-phase voltage value VCv is inputted to the feedback controller 80.

The feedback controller 80 carries out proportional control of the deviation inputted from the deviation calculator 78 in the same manner as the feedback controller 68 to thereby calculate a provisional V-phase current value.

The provisional V-phase current value outputted from the feedback controller 80 is inputted to the feedforward controller 82.

The feedforward controller 82 corrects the provisional V-phase current value outputted from the feedback controller 80 based on the V-phase current value iMv measured by the current sensor 36 to thereby calculate a V-phase command current value iCvc. The V-phase command current value iCv means a command current value representing the sum of the amount of current to be supplied to the capacitor Cv and the amount of current to be supplied to the V-phase winding of the motor 10. The V-phase command current value iCvc outputted from the feedforward controller 82 is inputted to the pulse width calculator 84.

The pulse width calculator 84 calculates an on duration (pulse width) of the drive signal gv1 and that of the drive signal gv2 based on: the V-phase command current value iCvc, the actual voltage value Vin across the high-voltage battery 12 measured by the voltage sensor 20, and the actual voltage value VCv across the capacitor Cv. The drive signals gv1 and gv2 respectively having their controlled on durations (pulse widths) control the switching elements Svp1, Svn1, Svp2, and Svn2 to thereby match an output current through the capacitor Cv and toward the V-phase winding of the motor 10 with the V-phase command current value iCvc.

Similarly, the W-phase command voltage Vwc corrected by the offset corrector 86 is inputted to the guard processor 88.

The guard processor 88 applies a guard process to the W-phase command voltage Vwc to thereby output a corrected W-phase command voltage Vwc' so as to prevent:

a voltage higher than a corresponding rated voltage from being applied to any element of the DC to DC converter 140W; and the coil Lw from being in saturation.

The corrected W-phase command voltage Vwc' outputted from the guard processor 88 is inputted to the deviation calculator 90.

The deviation calculator 90 calculates a deviation between the corrected W-phase command voltage Vwc' and a W-phase voltage value VCw actually measured by the voltage sensor 32 by subtracting the W-phase voltage value VCw from the corrected W-phase command voltage Vwc'. The deviation between the corrected W-phase command voltage Vwc' and the actually measured W-phase voltage value VCw is inputted to the feedback controller 92.

The feedback controller 92 carries out proportional control of the deviation inputted from the deviation calculator 90 in the same manner as the feedback controller 68 to thereby calculate a provisional W-phase current value.

The provisional W-phase current value outputted from the feedback controller 92 is inputted to the feedforward controller 94.

The feedforward controller 94 corrects the provisional W-phase current value outputted from the feedback controller 92 based on the W-phase current value iMw measured by the current sensor 38 to thereby calculate a W-phase command current value iCwc. The W-phase command current value iCw means a command current value representing the sum of the amount of current to be supplied to the capacitor Cw and the amount of current to be supplied to the W-phase winding of the motor 10. The W-phase command current value iCwc outputted from the feedforward controller 94 is inputted to the pulse width calculator 96.

The pulse width calculator 96 calculates an on duration (pulse width) of the drive signal gw1 and that of the drive signal gw2 based on: the W-phase command current value iCwc, the actual voltage value Via across the high-voltage battery 12 measured by the voltage sensor 20, and the actual voltage value VCw across the capacitor Cw. The drive signals gw1 and gw2 respectively having their controlled on durations (pulse widths) control the switching elements Swp1, Swn1, Swp2, and Swn2 to thereby match an output current through the capacitor Cw and toward the W-phase winding of the motor 10 with the W-phase command current value iCwc.

Next, operations of the pulse width calculator 72 will be fully described hereinafter with reference to FIGS. 5A and 5B. Note that operations of the pulse width calculator 84 and those of the pulse width calculator 96 are omitted in description because they are identical to the operations of the pulse width calculator 72.

Figure 5A:
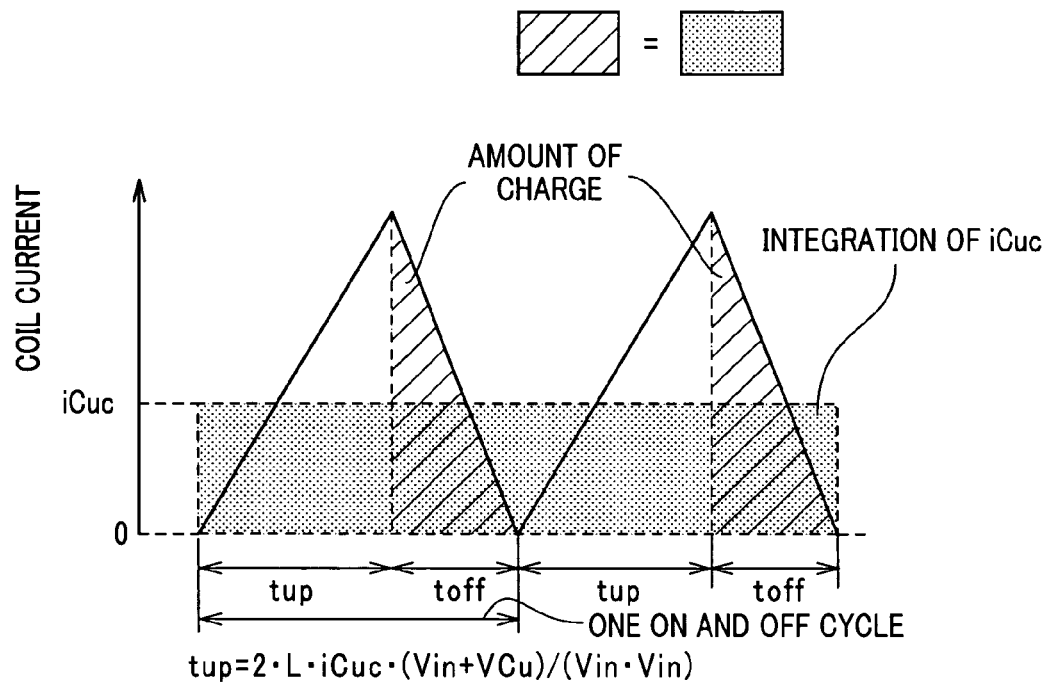
FIG. 5A is a graph schematically illustrating a current flowing through a coil Lu when charges are supplied to a capacitor Cu and a motor illustrated in FIG. 1 in the first mode of the chopper control according to the first embodiment.

FIG. 5A schematically illustrates a current flowing through the coil Lu when charges are supplied to the capacitor Cu and the motor 10 in the first mode of the chopper control (see FIGS. 2A and 2B). Referring to FIG. 5A, reference character tap represents the on duration of each of the switching elements Sup1 and Sun2.

As illustrated in FIG. 5A, when the switching elements Sup1 and Sun2 are turned on, a current flows through the closed loop circuit illustrated in FIG. 2A, resulting in that the current flowing through the coil Lu gradually increases.

After the on duration tup has elapsed since the on timing of each of the switching elements Sup1 and Sun2, the switching elements Sup1 and Sun2 are turned off. This allows a current to flow through the closed loop circuit illustrated in FIG. 2B, resulting in that the current flowing through the coil Lu gradually decreases. Thereafter, in the first embodiment, when the current through the coil Lu becomes zero, the switching elements Sup1 and Sun2 are switched on again.

Specifically, a current flows through the capacitor Cu and into the U-phase winding of the motor 10 during the switching elements Sup1 and Sun2 being off, and the current is gradually reduced. For this reason, in microscopic time scale, the current cannot be set as the U-phase command current value iCuc.

In order to address such a problem, in the first embodiment, an average value of the current to be outputted through the capacitor Cu and toward the U-phase winding of the motor 10 over a predetermined period is determined as the U-phase command current value iCuc. The predetermined period is set as one on and off cycle of each of the switching elements Sup1 and Sun2. One on and off cycle each of the switching elements Sup1 and Sun2 consists of the on duration tup and off duration toff of a corresponding one of the switching elements Sup1 and Sun2.

FIG. 5A schematically illustrates the amount of charges to be supplied to the capacitor Cu and the motor 10 as an area of the hatching portion.

Therefore, when the area of the hatching portion is matched with the integration of the U-phase command current value iCuc over one on and off cycle of each of the switching elements Sup1 and Sun2, an average value of an actual current outputted toward the capacitor Cu and the U-phase winding of the motor 10 over one on and off cycle of each of the switching elements Sup1 and Sun2 can be determined as the U-phase command current value iCuc.

The determination of the U-phase command current value iCuc set forth above can be achieved by determining the on duration tup as follows.

A peak current Ip flowing through the coil Lu while gradually increasing and decreasing is expressed by the following equation [c1] using an inductance L of the coil Lu, the on duration tup, and the voltage value Vin across the high-voltage battery 12:

$$Vin = L \cdot Ip/tup \qquad [c1]$$

The peak current Ip is also expressed by the following equation [c2] using the off duration toff and the voltage value VCu:

$$VCu = L \cdot Ip/toff \qquad [c2]$$

Based on the equations [c1] and [c2], a relationship between the on duration tup and off duration toff is expressed by the following equation [c3]:

$$Vin/VCu = toff/tup \qquad [c3]$$

The average value of the current to be outputted through the capacitor Cu and toward the U-phase winding of the motor 10 over one on and off cycle of each of the switching elements Sup1 and Sun2 is expressed by the following equation [c4]:

$$Ip \cdot toff / \{2 \cdot (tup + toff)\} = tup \cdot Vin \cdot Vin / 2 \cdot L \cdot (Vin + VCu) \qquad [c4]$$

When the equation [c4] is equal to the U-phase command current value iCuc, the following equation [c5] is established:

$$tup = 2 \cdot L \cdot iCuc \cdot (Vin + VCu)/(Vin \cdot Vin) \qquad [c5]$$

Figure 5B:
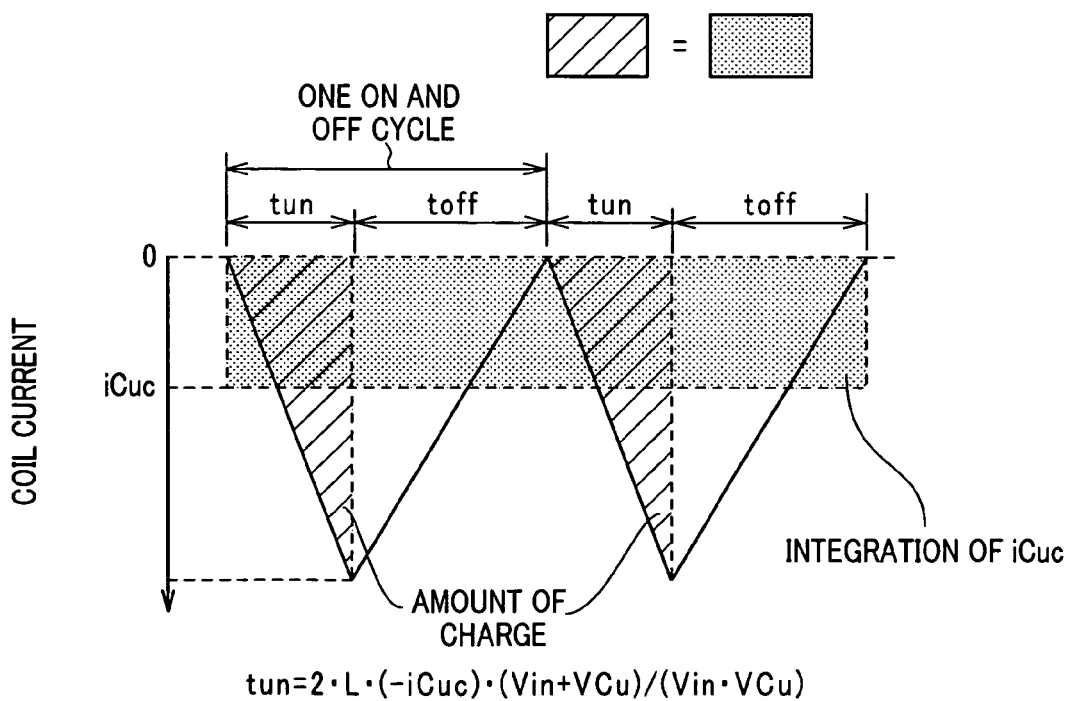
FIG. 5B is a graph schematically illustrating a current flowing through the coil Lu when charges are removed from the capacitor Cu and the motor in the second mode of the chopper control according to the first embodiment.

On the other hand, FIG. 5B schematically illustrates a current flowing through the coil Lu when charges are removed from the capacitor Cu and the motor 10 in the second mode of the chopper control (see FIGS. 2C and 2D). Referring to FIG. 5B, reference character tun represents the on duration of each of the switching elements Sun1 and Sup2.

As illustrated in FIG. 5B, when the switching elements Sun1 and Sup2 are turned on, a current flows through the closed loop circuit illustrated in FIG. 2C, resulting in that the current flowing through the coil Lu gradually increases.

After the on duration tun has elapsed since the on timing of each of the switching elements Sun1 and Sup2, the switching elements Sun1 and Sup2 are turned off. This allows a current to flow through the closed loop circuit illustrated in FIG. 2D, resulting in that the current flowing through the coil Lu gradually decreases. Thereafter, in the first embodiment, when the current through the coil Lu becomes zero, the switching elements Sun1 and Sup2 are switched on again.

Like the first mode, in the second mode, an average value of the current to be outputted through the capacitor Cu and toward the U-phase winding of the motor 10 over a predetermined period is determined as the U-phase command current value iCuc. The predetermined period is set as one on and off cycle of each of the switching elements Sun1 and Sup2. One on and off cycle each of the switching elements Sun1 and Sup2 consists of the on duration tun and off duration toff of a corresponding one of the switching elements Sun1 and Sup2.

Specifically, the second mode has a purpose of setting an average value of an actual current outputted toward the capacitor Cu and the U-phase winding of the motor 10 over one on and off cycle of each of the switching elements Sun1 and Sup2 as the U-phase command current value iCuc.

In order to achieve such a purpose, in the second mode, the amount of charges to be removed from the capacitor Cu and the motor 10, illustrated as an area of the hatching portion in FIG. 5B, is matched with the integration of the U-phase command current value iCuc over one on and off cycle of each of the switching elements Sun1 and Sup2.

This matching can be achieved by determining the on duration tun in the following equation [c6] in the same manner as the determination of the on duration tup:

$$tun = 2 \cdot L \cdot (-iCuc) \cdot (Vin + VCu)/(Vin \cdot VCu) \quad [c6]$$

In the equation [c6], because the direction in which current flows toward the capacitor Cu and the motor 10 is positive, the U-phase command current value iCuc is multiplied by so that the on duration tun become positive.

The equations [c5] and [c6] allow input of the U-phase command current value iCuc, the voltage value Vin across the high-voltage battery 12, and the voltage value VCu across the capacitor Cu to the pulse width calculator 72 to calculate the on durations tup and tun by the pulse width calculator 72. For example, the pulse width calculator 72 is designed to output any one of the on durations tup and tun based on the polarity of the U-phase command current value iCuc.

Figure 6:
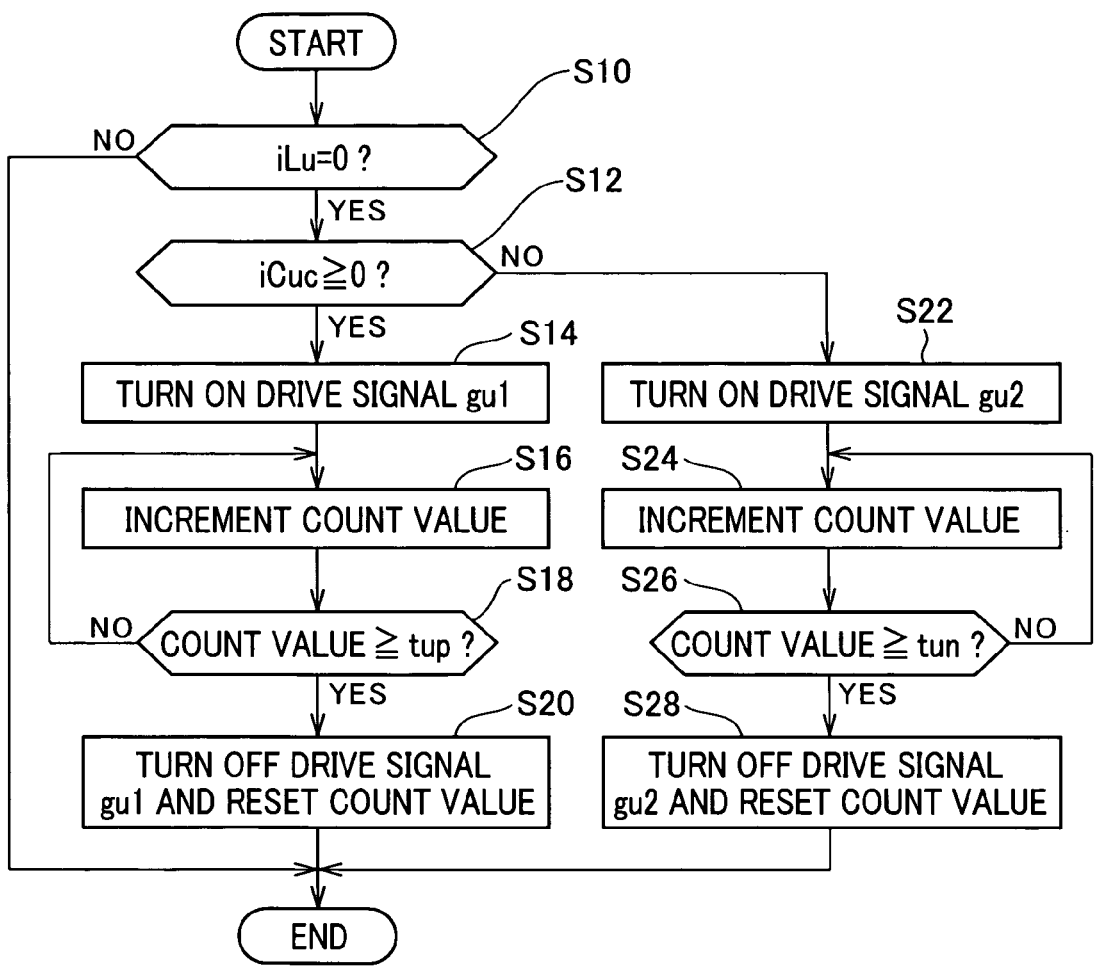
FIG. 6 is a flowchart schematically illustrating a routine of the chopper control for a TCV illustrated in FIG. 1 according to the first embodiment.

FIG. 6 schematically illustrates a routine of the chopper control for the DC to DC converter 140U according to the first embodiment. The routine is designed to be executed by the control apparatus 40 in accordance with a program; this program can be stored or loaded in the control apparatus 40. For example, the program is designed to be repeatedly executed by the control apparatus 40 at a preset cycle.

A routine of the chopper control for each of the DC to DC converters 140V and 140W according to the first embodiment is also carried out by the control apparatus 40 at a preset cycle. The routine of the chopper control for each of the DC to DC converters 140V and 140W is however omitted in description because it is substantially the same as the routine of the chopper control for the DC to DC converter 140U.

When starting the routine, the control apparatus 40 determines whether a current iLu through the coil Lu measured by the current sensor 22 is zero in step S10.

The operation in step S10 determines the timing when either the set of the switching elements Sup1 and Sun2 or the set of the switching elements Sun1 and Sup2 is switched from off state to on state.

Upon determining that the current iLu through the coil Lu measured by the current sensor 22 is zero (YES in step S10), the control apparatus 40 determines that either the set of switching elements Sup1 and Sun2 or the set of switching elements Sun1 and Sup2 is switched from off state to on state. Then, the control apparatus 40 proceeds to step S12.

In step S12, the control apparatus 40 determines whether the U-phase command current value iCuc is equal to or greater than zero. The operation in step S12 determines whether:

the set of switching elements Sup1 and Sun2 are switched on so as to supply charges to the capacitor Cu and the motor 10; or the set of switching elements Sun1 and Sup2 are switched on so as to remove charges from the capacitor Cu and the motor 10.

Upon determining that the U-phase command current value iCuc is equal to or greater than zero (YES in step S12), the control apparatus 40 turns the drive signal gu1 on to thereby turn the set of switching elements Sup1 and Sun2 on in step S14. This carries out the chopper control of the DC to DC converter 140U in the first mode.

At the moment when the set of switching elements Sup1 and Sun2 is turned on, the control apparatus 40 measures an elapsed time since the turning-on timing of the set of switching elements Sup1 and Sun2 by, for example, cyclically incrementing a count value of a counter preinstalled therein by software or hardware in step S16. An initial value of the count value is set to zero.

Next, the control apparatus 40 determines whether the count value is equal to or greater than a predetermined threshold corresponding to the predetermined on duration tup in step S18.

Upon determining that the count value is lower than the predetermined threshold (NO in step S18), the control apparatus 40 returns to step S16 and repeatedly carries out the operations in steps S16 and S18 until the count value is equal to or greater than the predetermined threshold.

Otherwise, determining that the count value is equal to or greater than the predetermined threshold (YES in step S18), the control apparatus 40 turns the drive signal gu1 off and resets the count value of the counter to the initial value of zero in step S20.

On the other hand, in step S12, upon determining that the U-phase command current value iCuc is lower than zero, in other words, the U-phase command current value iCuc is negative in polarity (NO in step S12), the control apparatus 40 shifts to step S22.

In step S22, the control apparatus 40 turns the drive signal gu2 on to thereby turn the set of switching elements Sun1 and Sup2 on. This carries out the chopper control of the DC to DC converter 140U in the second mode.

At the moment when the set of switching elements Sun1 and Sup2 is turned on, the control apparatus 40 measures an elapsed time since the turning-on timing of the set of switching elements Sun1 and Sup2 by, for example, cyclically incrementing a count value of a counter preinstalled therein by software or hardware in step S24. An initial value of the count value is set to zero. The counter used in step S16 can be used as the counter in step S24, or another counter can be used as the counter in step S24.

Next, the control apparatus 40 determines whether the count value is equal to or greater than a predetermined threshold corresponding to the predetermined on duration tun in step S26.

Upon determining that the count value is lower than the predetermined threshold (NO in step S26), the control apparatus 40 returns to step S24 and repeatedly carries out the operations in steps S24 and S26 until the count value is equal to or greater than the predetermined threshold.

Otherwise, determining that the count value is equal to or greater than the predetermined threshold (YES in step S26), the control apparatus 40 turns the drive signal gu2 off and resets the count value of the counter to the initial value of zero in step S28.

Figure 7A:
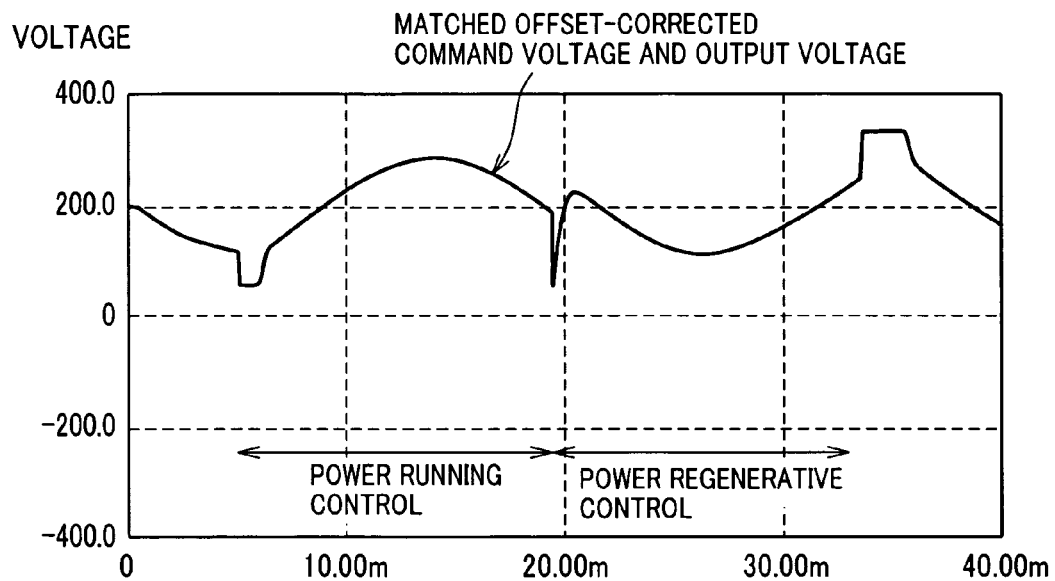
FIG. 7A is a graph schematically illustrating the result of adjustment of a voltage across each of capacitors Cu, Cv, and Cw in the chopper control according to the first embodiment.

FIG. 7A schematically illustrates the result of adjustment of the voltage across each of the capacitors Cu, Cv, and Cw in the chopper control according to the first embodiment.

Specifically, in FIG. 7, during the chopper control mode, the request torque is rapidly changed to thereby shift the control of the motor 10 from power running control mode to power regenerative control mode.

As illustrated in FIG. 7A, even if the request torque is rapidly changed, the following capability of the voltage across each of the capacitors Cu, Cv, and Cw (output voltage of each of the DC to DC converters 140U, 140V, and 140W) with respect to a corresponding one of the offset-corrected command voltages Vuc', Vvc', and Vwc' is kept high.

Figure 7B:
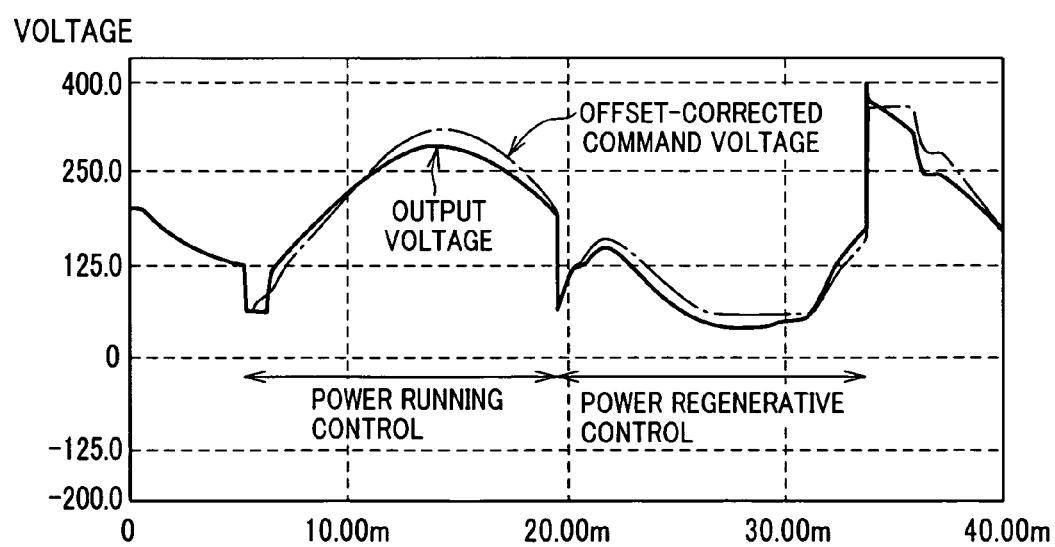
FIG. 7B is a graph schematically illustrating the result of adjustment of the voltage across each of the capacitors Cu, Cv, and Cw in an alternative chopper control according to the first embodiment.

In contrast, FIG. 7B schematically illustrates the result of adjustment of the voltage across each of the capacitors Cu, Cv, and Cw in an alternative chopper control. In the alternative chopper control, no U-, V-, and W-phase command current values iCuc, iCvc, and iCwc are calculated and the on durations tup and tun are directly calculated based on the respective deviations between the corrected U, V-, and W-phase command voltage Vuc', Vvc', and Vwc' and the U-, V-, and W-phase voltage value VCu, VCv, and VCw.

As clearly illustrated in FIG. 7B, the following capability of the voltage across each of the capacitors Cu, Cv, and Cw (output voltage of each of the DC to DC converters 140U, 140V, and 140W) with respect to a corresponding one of the offset-corrected command voltages Vuc', Vvc', and Vwc' becomes deteriorated.

As descried above, the control system CS according to the first embodiment is configured to:

respectively calculate, based on the command voltages Vuc, Vvc, and Vwc, the U-, V-, and W-phase command current values iCuc, iCvc, and iCwc for the capacitors Cu, Cv, and Cw and the motor 10 to thereby carry out the chopper control of the TCV 14 in the first and second modes.

This achieves the first effect of grasping the U-, V-, and W-phase command current values iCuc, iCuc, and iCwc required to control the voltages across the capacitors Cu, Cv, and Cw based on the command voltages Vuc, Vvc, and Vwc, respectively. Thus, it is possible to properly control the voltages across the respective capacitors Cu, Cv, and Cw based on the command voltages Vuc, Vvc, and Vwc, respectively.

The control system CS is configured to:

respectively calculate the U-, V-, and W-phase command current values iCuc, iCvc, and iCwc while considering the U-, V, and W-phase current values iMu, iMv, and iMw flowing through the respective U-, V-, and W-phase windings of the motor 10 connected to the capacitors Cu, Cv, and Cw.

This achieves the second effect of compensating, by feedforward control, for disturbance factors in the adjustment of the voltages across the capacitors Cu, Cv, and Cw based on the command voltages Vuc, Vvc, and Vwc, respectively.

The control system CS is configured to respectively calculate, based on the deviations between the voltage values VCu, VCv, and VCw across the capacitors Cu, Cv, and Cw and the command voltages Vuc, Vvc, and Vwc, the U-, V-, and W-phase command current values iCuc, iCvc, and iCwc. This achieves the third effect of easily and properly matching the voltage values VCu, VCv, and VCw across the capacitors Cu, Cv, and Cw with the corresponding command voltages Vuc, Vvc, and Vwc, respectively.

More specifically, the control system CS is configured to:

offset each of the command voltages Vuc, Vvc, and Vwc in order to keep unchanged the polarity of the voltage across each of the capacitors Cu, Cv, and Cw; and after the offset, calculate, based on the deviations between the voltage values VCu, VCv, and VCw across the capacitors Cu, Cv, and Cw and the offset-corrected command voltages Vuc', Vvc', and Vwc', the U-, V-, and W-phase command current values iCuc, iCvc, and iCwc.

This keeps unchanged the polarity of the voltage across each of the capacitors Cu, Cv, and Cw while changing the voltage values VCu, VCu, and VCw across the capacitors Cu, Cv, depending on the offset-corrected command voltages Vuc', Vvc', and Vwc'. Thus, it is possible to, as the fourth effect, maintain high the controllability of the voltage to be supplied to each of the three-phase windings of the motor 10 even if the TCV 14 is equipped with a non-inverting back boost converter; this non-inverting back boost converter cannot reverse the polarity of each of the capacities Cu, Cv, and Cw, The control system CS is configured to:

variably control how to switch each of the switching elements to thereby match, with a corresponding one of U-, V-, and W-phase command current values iCuc, iCvc, and iCwc, the average value of the current to be outputted to each of the capacitors Cu, Cv, and Cw over one on and off cycle of a corresponding one of the switching elements.

In other words, the control system CS is configured to:

variably control how to switch gradual increase in the current through each of the capacitor Cu, Cv, and Cw and gradual decrease therein such that the average value of the current to be outputted to each of the capacitors Cu, Cv, and Cw over one on and off cycle of a corresponding one of the switching elements is matched with a corresponding one of U-, V-, and W-phase command current values iCuc, iCvc, and iCwc.

This achieves the fifth effect of properly matching the current to be outputted to each of the capacitors Cu, Cv, and Cw with a corresponding one of V-, and W-phase command current values iCuc, iCvc, and iCwc on a time scale as short as possible to thereby appropriately adjust the voltage across each of the capacitors Cu, Cv, and Cw according to a corresponding one of the command voltages Vuc, Vvc, and Vwc.

The control system CS is configured to:

use, as manipulated variables, the on durations tup and tun for the switching elements of the chopper control; and turn a corresponding set of the switching elements on every time the current through each of the coils Lu, Lv, and Lw becomes zero.

This achieves the sixth effect of relatively easily calculating the current through each of the coils Lu, Lv, and Lw and/or the current flowing to each of the capacitors Cu, Cv, and Cw.

The control system CS is configured to carry out the chopper control in the first and second modes for each phase while taking the voltage values VCu, VCv, and VCw across the capacitors Cu, Cv, and Cw and the voltage value across Vin the high-voltage battery 12 into consideration.

This achieves the seventh effect of reliably understanding the behavior of the current to be supplied to each of the capacitors Cu, Cv, and Cw and the motor 10. This properly adjusts the output current to each of the capacitors Cu, Cv, and Cw and the motor 10 to a corresponding one of the command current values iCuc, iCwc, and iCwc.

The control system CS is configured such that the TCV 14 is made up of the non-inverting back-boost converters 140U, 140V, and 140W for U-, V-, and W-phase requiring no electrical insulations. This eliminates transformers from the TCV 14, making it possible to reduce the TCV 14 in size.

Second Embodiment

A control system CSA according to the second embodiment of the present invention will be described hereinafter with reference to FIGS. 8, 9A to 9D, 10A, and 10B.

The structure of the control system CSA according to the second embodiment is substantially identical to that of the control system CS according to the first embodiment except for the following different points. So, like parts between the control systems CS and CSA according to the first and second embodiments, to which like reference characters are assigned, are omitted or simplified in description.

Figure 8:
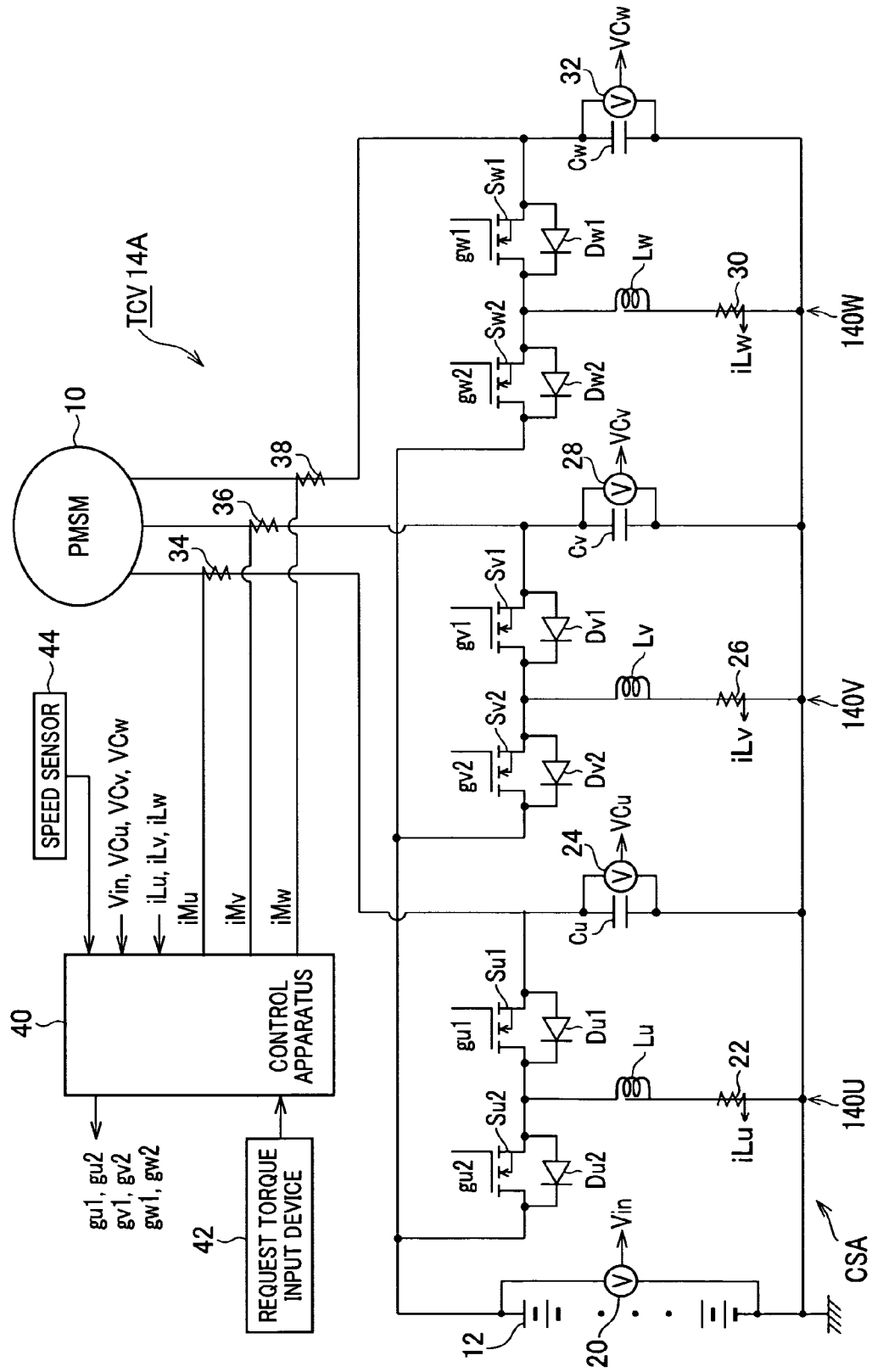
FIG. 8 is a circuit diagram of a control system according to the second embodiment of the present invention.

FIG. 8 schematically illustrates an example of the circuit structure of a control system CSA according to the second embodiment.

The control system CSA is equipped with a TAD 14A. The TDA 14A is provided with, for example, a back-boost converter 140A for each phase of the motor 10 to be electrically connected to each phase winding of the motor 10.

The back-boost converter 140A for U-phase, referred to as "DC to DC converter 140UA", consists of a set of series-connected switching elements Su1 and Su2, a capacitor Cu, and a coil Lu.

The set of series-connected switching elements Su1 and Su2 is arranged to electrically connect the positive electrode of the high-voltage battery 12 to a connecting point between the capacitor Cu and the one terminal of the U-phase winding of the motor 10.

The coil Lu is arranged to electrically connect a connecting point between the adjacent switching elements Su1 and Su2 to the signal ground.

The DC to DC converter 140UA includes diodes, such as its intrinsic diodes or alternative diodes, Du1 and Du2 electrically connected in antiparallel to the switching elements Su1 and Su2, respectively.

More specifically, the source of the switching element Sup1 is electrically connected to the connecting point between the capacitor Cu and the one terminal of the U-phase winding of the motor 10. The drain of the switching element Su1 and the source of the switching element Su2 are commonly connected to each other at the connecting point. The drain of the switching element Su2 is electrically connected to the positive electrode of the high-voltage battery 12.

Similarly, the back-boost converter 140A for V-phase, referred to as "DC to DC converter 140VA", consists of a set of series-connected switching elements Sv1 and Sv1, a capacitor Cv, a coil Lv, and diodes Dv1 and Dv2.

In addition, the back-boost converter 140A for W-phase, referred to as "DC to DC converter 140WA", consists of a set of series-connected switching elements Sw1 and Sw2, a capacitor Cw, and a coil Lw. The circuit configuration of each of the DC to DC converters 140VA and 140WA is identical to that of the DC to DC converter 140UA so that like reference characters refer to like parts in FIG. 8.

In addition, the current sensor 22 is electrically connected in series between the coil Lu and the signal ground.

FIGS. 9A to 9D schematically illustrate various modes of the chopper control according to the second embodiment.

Note that, in FIGS. 9A to 9D, one of the DC to DC converters constituting the TCV 14A is illustrated, and reference characters from which alpha characters corresponding to any one phase are eliminated are assigned to the elements of one of the DC to DC converters.

For example, switching elements Su1, Sv1, and Sw1 are each represented by common reference character S1 in FIGS. 9A to 9D.

In addition, note that, in FIGS. 9A to 9D, it is assumed that in- and outflow of charges between the capacitor C and the one terminal of a corresponding phase winding of the motor 10 are so low as to be insignificant.

The first mode of the chopper control for supplying charges to the capacitor C and motor 10 will be described hereinafter with reference to FIGS. 9A and 9B.

When the switching element S1 is switched on in response to the rising of the drive signal gu1 with a polarity inversion voltage being charged in the capacitor C with respect to the voltage across the high-voltage battery 12, the capacitor C discharges negative electrodes so as to be positively boosted (negatively stepped down).

The negative discharge causes a current to flow through a closed loop circuit consisting of the capacitor C, the coil L, and the switching element S1 (see the dashed arrow in FIG. 9A) so that electromagnetic energy is charged in the coil L and the absolute value of the polarity inversion voltage across the capacitor C is reduced.

Thereafter, when the switching element S1 is switched off in response to the falling of the drive signal gu1, the electromagnetic energy stored in the coil L is discharged therefrom as electrical energy. In other words, a back electromotive force based on the electromagnetic energy stored in the coil L causes a current to flow through a closed loop circuit consisting of the coil L, the diode D2, and the high-voltage battery 12 (see the dashed arrow in FIG. 9B). This charges the high-voltage battery 12.

Next, the second mode of the chopper control for removing charges from the capacitor C and motor 10 will be described hereinafter with reference to FIGS. 9C and 9D.

When the switching element S2 is switched on in response to the rising of the drive signal gu2, a current flows through a closed loop circuit consisting of the high-voltage battery 12, the switching element S2, and the coil L (see the dashed arrow in FIG. 9C). This applies a voltage across the coil L so that electromagnetic energy is charged in the coil L.

Thereafter, when the switching element S2 is switched off in response to the falling of the drive signal gu2, the electromagnetic energy stored in the coil L is discharged therefrom as electrical energy. In other words, a back electromotive force based on the electromagnetic energy stored in the coil L causes a current to flow through a closed loop circuit consisting of the coil L, the capacitor C, and the diode D1.

This causes the capacitor C to discharge positive electrodes so as to be negatively boosted (positively stepped down), resulting in that the absolute value of the polarity inversion voltage across the capacitor C is increased.

The chopper control in the first and second modes for each phase of the motor 10 converts the voltage across the DC power source (the high-voltage battery 12) into a desired analog voltage value to thereby output it to a corresponding one of the phase winding of the motor 10. In other words, the chopper control in the first and second modes for each phase of the motor 10 adjusts the voltage across the capacitor C to a desired analog voltage value so that the desired analog voltage is applied to a corresponding one of the phase winding of the motor 10.

Next, operations of the pulse width calculator 72 according to the second embodiment will be fully described hereinafter with reference to FIGS. 10A and 10B. Note that operations of the pulse width calculator 84 and those of the pulse width calculator 96 are omitted in description because they are identical to the operations of the pulse width calculator 72.

Figure 10A:
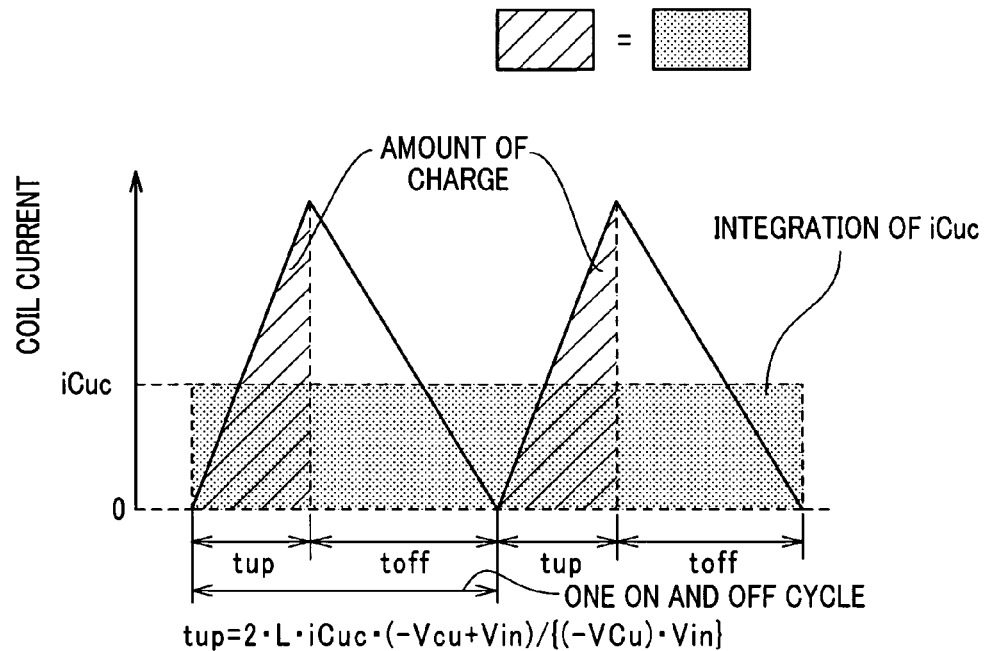
FIG. 10A is a graph schematically illustrating a current flowing through the coil Lu when charges are supplied to the capacitor Cu and the motor 1 in the first mode of the chopper control according to the second embodiment.

FIG. 10A schematically illustrates a current flowing through the coil Lu when charges are supplied to the capacitor Cu and the motor 10 in the first mode of the chopper control (see FIGS. 9A and 9B). Referring to FIG. 10A, reference character tup represents the on duration of the switching element Su1.

As illustrated in FIG. 10A, when the switching elements Su1 is turned on, a current flows through the closed loop circuit illustrated in FIG. 9A, resulting in that the current flowing through the coil Lu gradually increases.

After the on duration tup has elapsed since the on timing of the switching element Su1, the switching element Su1 is turned off. This allows a current to flow through the closed loop circuit illustrated in FIG. 9B, resulting in that the current flowing through the coil Lu gradually decreases. Thereafter, in the second embodiment, when the current through the coil Lu becomes zero, the switching element Su1 is switched on again.

As well as the first embodiment, in the second embodiment, an average value of the current to be outputted through the capacitor Cu and toward the U-phase winding of the motor 10 over a predetermined period is determined as the U-phase command current value iCuc. The predetermined period is set as one on and off cycle of each of the switching element Su1. One on and off cycle of the switching element Su1 consists of the on duration tup and off duration toff of the switching element Su1.

FIG. 10A schematically illustrates the amount of charges to be supplied to the capacitor Cu and the motor 10 as an area of the hatching portion.

Therefore, when the area of the hatching portion is matched with the integration of the U-phase command current value iCuc over one on and off cycle of the switching element Su1, an average value of an actual current outputted toward the capacitor Cu and the U-phase winding of the motor 10 over one on and off cycle of the switching element Su1 can be determined as the U-phase command current value iCuc.

The determination of the U-phase command current value iCuc set forth above can be achieved by determining the on duration tup as follows.

This matching can be achieved by determining the on duration tup in the following equation [c7] in the same manner as the determination of the on duration tup according to the first embodiment:

$$tup=2 \cdot iCuc \cdot (Vin-VCu)/(-VCu \cdot Vin) \quad [c7]$$

In the equation [c7], because one electrode of the capacitor Cu electrically connected to the U-phase winding of the motor 10 is defined to be positive, the voltage value across the capacitor Cu is multiplied by "−1".

Figure 10B:
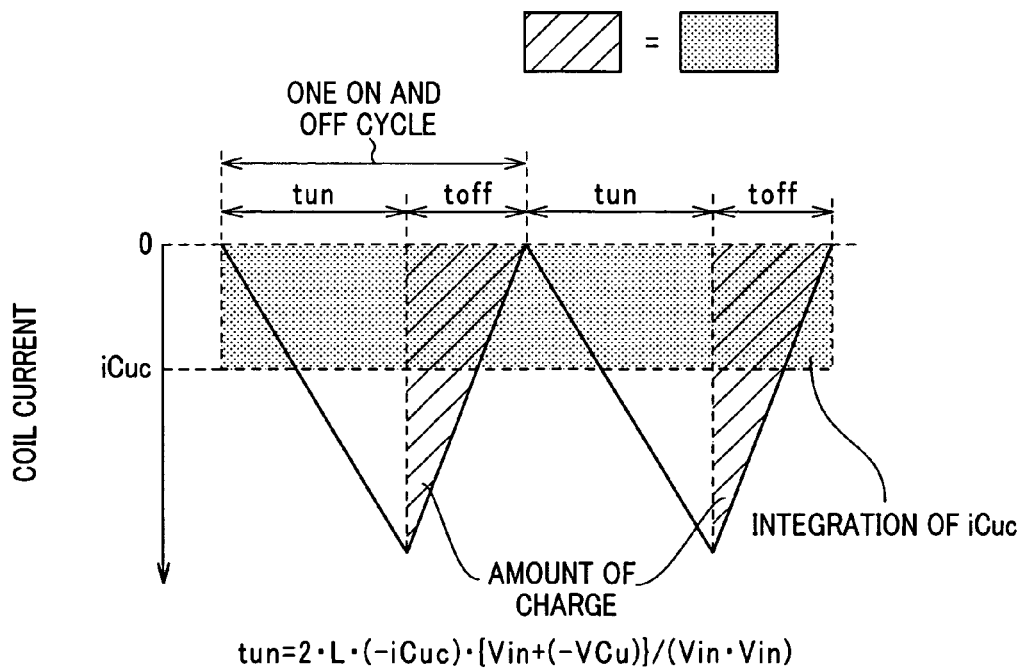
FIG. 10B is a graph schematically illustrating a current flowing through the coil Lu when charges are removed from the capacitor Cu and the motor in the second mode of the chopper control according to the second embodiment.

On the other hand, FIG. 10B schematically illustrates a current flowing through the coil Lu when charges are removed from the capacitor Cu and the motor 10 in the second mode of the chopper control (see FIGS. 9C and 9D). Referring to FIG. 10B, reference character tun represents the on duration of the switching element Su2.

As illustrated in FIG. 10B, when the switching element Su2 is turned on, a current flows through the closed loop circuit illustrated in FIG. 9C, resulting in that the absolute value of the current flowing through the coil Lu gradually increases. Note that, because a direction from the one electrode (positive electrode) of the capacitor Cu to the U-phase winding of the motor 10 is defined to be a positive direction, in FIG. 10B, the current flowing through the coil Lu seems to be gradually reduced below zero.

After the on duration tun has elapsed since the on timing of the switching element Su2, the switching element Su2 is turned off. This allows a current to flow through the closed loop circuit illustrated in FIG. 9D, resulting in that the absolute value of the current flowing through the coil Lu gradually decreases. Thereafter, in the second embodiment, when the current through the coil Lu becomes zero, the switching element Su2 is switched on again.

Like the first mode, in the second mode, an average value of the current to be outputted through the capacitor Cu and toward the U-phase winding of the motor 10 over a predetermined period is determined as the U-phase command current value iCuc. The predetermined period is set as one on and off cycle of the switching element Su2. One on and off cycle of the switching element Su2 consists of the on duration run and off duration toff of the switching element Su2.

Specifically, the second mode has a purpose of setting an average value of an actual current outputted toward the capacitor Cu and the U-phase winding of the motor 10 over one on and off cycle of the switching element Su2 as the U-phase command current value iCuc.

In order to achieve such a purpose, in the second mode, the amount of charges to be removed from the capacitor Cu and the motor 10, illustrated as an area of the hatching portion in FIG. 10B, is matched with the integration of the U-phase command current value iCuc over one on and off cycle of the switching element Su2.

This matching can be achieved by determining the on duration tun in the following equation [c8] in the same manner as the determination of the on duration tup:

$$tun=2 \cdot L \cdot (-iCuc) \cdot (Vin-VCu)/(Vin \cdot Vin) \quad [c8]$$

The equations [c7] and [c8] allow input of the U-phase command current value iCuc, the voltage value Vin across the high-voltage battery 12, and the voltage value VCu across the capacitor Cu to the pulse width calculator 72 to calculate the on durations tup and tun by the pulse width calculator 72.

Other structures and operations of the control system CSA according to the second embodiment are identical to those of the control system CA according to the first embodiment.

Thus, the control system CSA according to the second embodiment also achieves the first to eighth effects achieved by the control system CS according to the first embodiment.

Third Embodiment

A control system CSB according to the third embodiment of the present invention will be described hereinafter with reference to FIGS. 11, 12A to 12D, 13A, and 13B.

The structure of the control system CSB according to the third embodiment is substantially identical to that of the control system CS according to the first embodiment except for the following different points. So, like parts between the control systems CS and CSB according to the first and third embodiments, to which like reference characters are assigned, are omitted or simplified in description.

Figure 11:
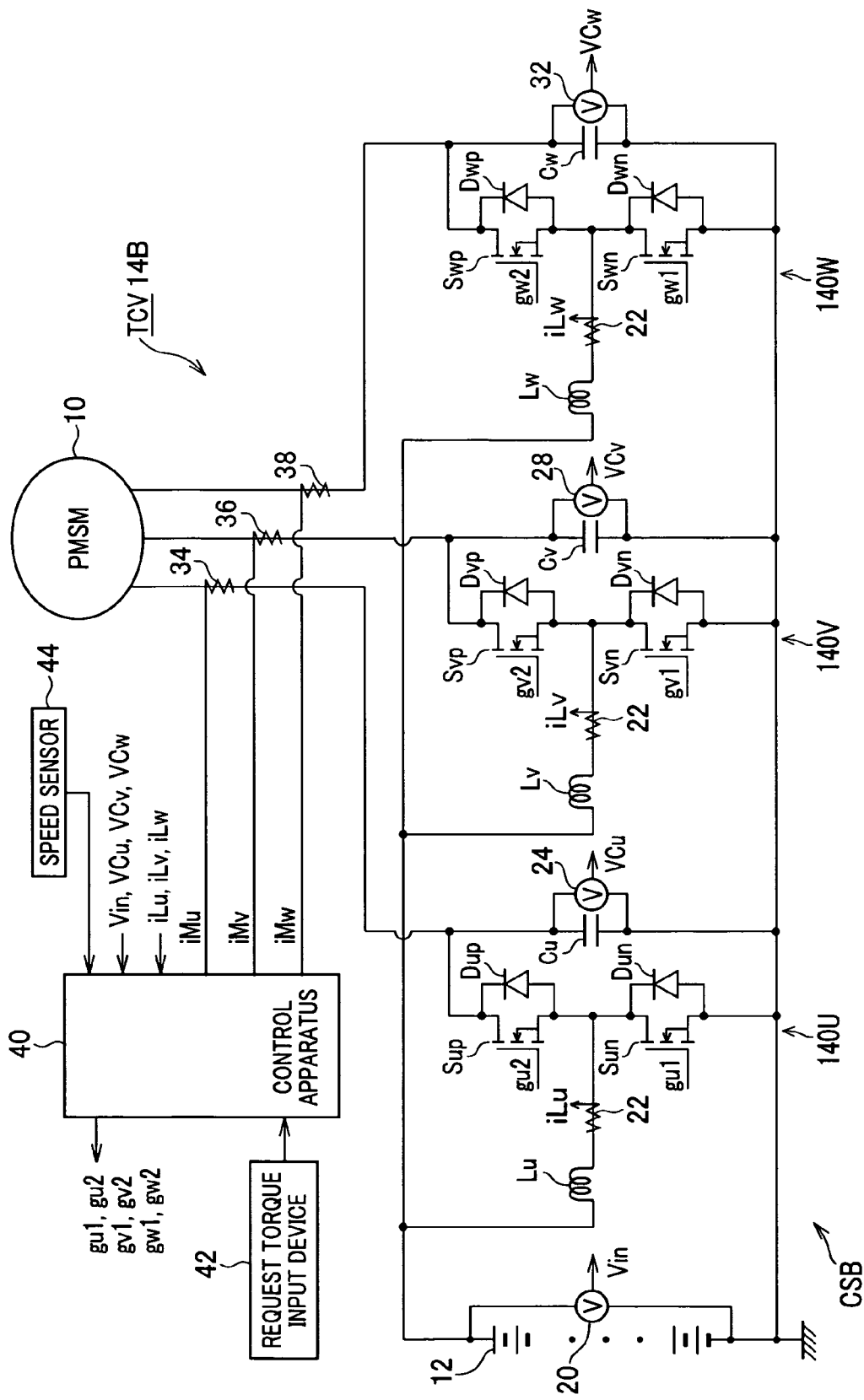
FIG. 11 is a circuit diagram of a control system according to the third embodiment of the present invention.

FIG. 11 schematically illustrates an example of the circuit structure of a control system CSB according to the third embodiment.

The control system CSB is equipped with a TAD 14B. The TDA 14B is provided with, for example, a boost converter 140B for each phase of the motor 10 to be electrically connected to each phase winding of the motor 10.

The boost converter 140B for U-phase, referred to as "DC to DC converter 140UB", consists of a capacitor Cu, a set of series-connected switching elements Sup and Sun, and a coil Lu.

The set of series-connected switching elements Sup and Sun is electrically connected in parallel to the capacitor Cu. The capacitor Cu is electrically connected between the one terminal of the U-phase winding of the motor 10 and the signal ground.

The coil Lu is arranged to electrically connect a connecting point between the adjacent switching elements Su1 and Su2 to the positive electrode of the high-voltage battery 12.

The DC to DC converter 140UB includes diodes, such as its intrinsic diodes or alternative diodes, Dup and Dun electrically connected in antiparallel to the switching elements Sup and Sun, respectively.

More specifically, the drain of the switching element Sup is electrically connected to the connecting point between the capacitor Cu and the one terminal of the U-phase winding of the motor 10. The source of the switching element Sup and the drain of the switching element Sun are commonly connected to each other at the connecting point. The source of the switching element Su2 is electrically connected to the signal ground.

Similarly, the boost converter 140B for V-phase, referred to as "DC to DC converter 140VB", consists of a set of series-connected switching elements Svp and Svn, a capacitor Cv, a coil Lv, and diodes Dvp and Dvn.

In addition, the boost converter 140B for W-phase, referred to as "DC to DC converter 140WB", consists of a set of series-connected switching elements Swp and Swn, a capacitor Cw, and a coil Lw. The circuit configuration of each of the DC to DC converters 140VB and 140WB is identical to that of the DC to DC converter 140UB so that like reference characters refer to like parts in FIG. 11.

In addition, the current sensor 22 is electrically connected in series between the coil Lu and the positive electrode of the high-voltage battery 12.

FIGS. 12A to 12D schematically illustrate various modes of the chopper control according to the third embodiment.

Note that, in FIGS. 12A to 12D, one of the DC to DC converters constituting the TCV 14B is illustrated, and reference characters from which alpha characters corresponding to any one phase are eliminated are assigned to the elements of one of the DC to DC converters.

For example, switching elements Sup, Svp, and Swp are each represented by common reference character Sp in FIGS. 12A to 12D.

In addition, note that, in FIGS. 12A to 12D, it is assumed that in- and outflow of charges between the capacitor C and the one terminal of a corresponding phase winding of the motor 10 are so low as to be insignificant.

The first mode of the chopper control for supplying charges to the capacitor C and motor 10 will be described hereinafter with reference to FIGS. 12A and 12B.

Figure 12A:
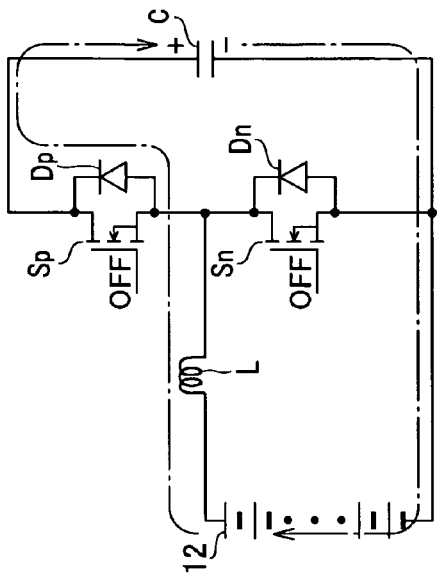
FIG. 12A is a circuit diagram schematically illustrating chopper control in the first mode upon the drive signal gu1 being on according to the third embodiment.

When the switching element Sn is switched on in response to the rising of the drive signal gu1, a current flows through a closed loop circuit consisting of the high-voltage battery 12, the coil L, and the switching element Sn (see the dashed arrow in FIG. 12A). This allows electromagnetic energy to be charged in the coil L.

Thereafter, when the switching element Sn is switched off in response to the falling of the drive signal gu1, the electromagnetic energy stored in the coil L is discharged therefrom as electrical energy.

Figure 12B:
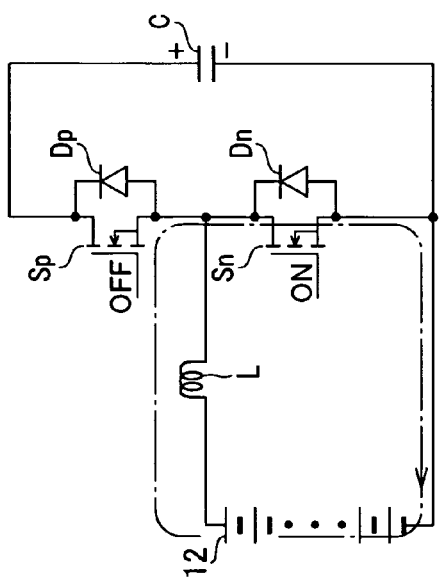
FIG. 12B is a circuit diagram schematically illustrating the chopper control in the first mode upon the drive signal gu1 being off according to the third embodiment.

Specifically, the sum of the high-voltage battery 12 and a back electromotive force based on the electromagnetic energy stored in the coil L, that is, a boosted voltage from the voltage value across the high-voltage battery 12 causes a current to flow through a closed loop circuit consisting of the high-voltage battery 12, the coil L, the diode Dp, and the capacitor C (see the dashed arrow in FIG. 12B). This charges the capacitor C.

Next, the second mode of the chopper control for removing charges from the capacitor C and motor 10 will be described hereinafter with reference to FIGS. 12C and 12D.

Figure 12C:
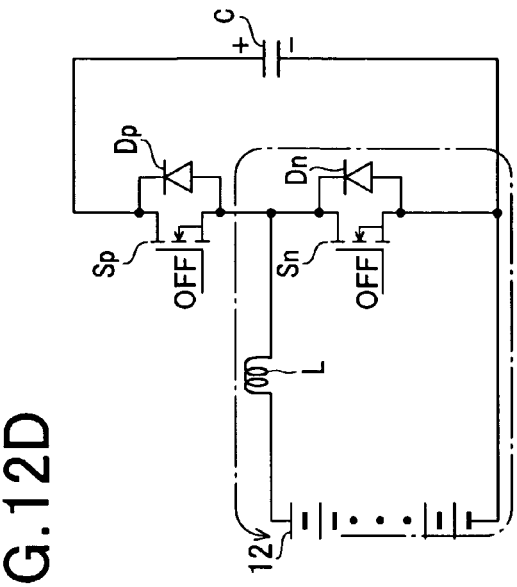
FIG. 12C is a circuit diagram schematically illustrating chopper control in the second mode upon drive signal gu2 being on according to the third embodiment.

When the switching element Sp is switched on in response to the rising of the drive signal gu2, the capacitor C discharges to thereby cause a current to flow through a closed loop circuit consisting of the capacitor C, the switching element Sp, the coil L, and the high-voltage battery 12 (see the dashed arrow in FIG. 12C). This removes charges from the capacitor C.

This applies a voltage across the coil L so that electromagnetic energy is charged in the coil L.

Thereafter, when the switching element Sp is switched off in response to the falling of the drive signal gu2, the electromagnetic energy stored in the coil L is discharged therefrom as electrical energy. In other words, a back electromotive force based on the electromagnetic energy stored in the coil L causes a current to flow through a closed loop circuit consisting of the coil L, the high-voltage battery 12, and the diode Dn.

The chopper control in the first and second modes for each phase of the motor 10 converts the voltage across the DC power source (the high-voltage battery 12) into a desired analog voltage value to thereby output it to a corresponding one of the phase winding of the motor 10. In other words, the chopper control in the first and second modes for each phase of the motor 10 adjusts the voltage across the capacitor C to a desired analog voltage value so that the desired analog voltage is applied to a corresponding one of the phase winding of the motor 10.

Next, operations of the pulse width calculator 72 according to the third embodiment will be fully described hereinafter with reference to FIGS. 13A and 13B. Note that operations of the pulse width calculator 84 and those of the pulse width calculator 96 are omitted in description because they are identical to the operations of the pulse width calculator 72.

Figure 13A:
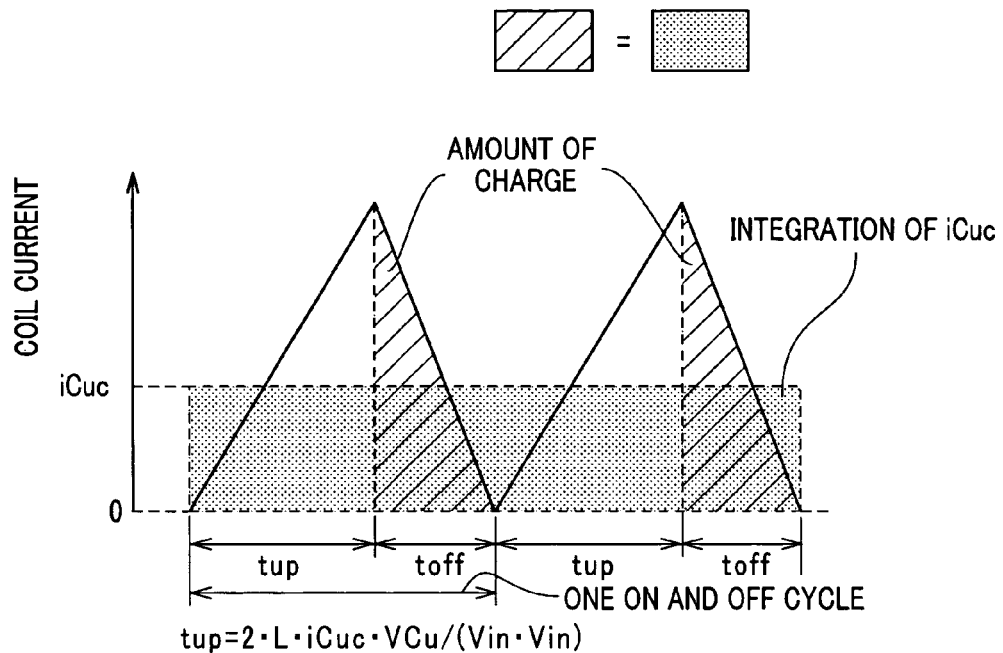
FIG. 13A is a graph schematically illustrating a current flowing through the coil Lu when charges are supplied to the capacitor Cu and the motor 1 in the first mode of the chopper control according to the third embodiment.

FIG. 13A schematically illustrates a current flowing through the coil Lu when charges are supplied to the capacitor Cu and the motor 10 in the first mode of the chopper control (see FIGS. 12A and 12B). Referring to FIG. 13A, reference character tup represents the on duration of the switching element Sun.

As illustrated in FIG. 13A, when the switching element Sun is turned on, a current flows through the closed loop circuit illustrated in FIG. 12A, resulting in that the current flowing through the coil Lu gradually increases.

After the on duration tup has elapsed since the on timing of the switching element Sun, the switching element Sun is turned off. This allows a current to flow through the closed loop circuit illustrated in FIG. 12B, resulting in that the current flowing through the coil Lu gradually decreases. Thereafter, in the third embodiment, when the current through the coil Lu becomes zero, the switching element Sun is switched on again.

As well as the first embodiment, in the third embodiment, an average value of the current to be outputted through the capacitor Cu and toward the U-phase winding of the motor 10 over a predetermined period is determined as the U-phase command current value iCuc. The predetermined period is set as one on and off cycle of each of the switching element Sun. One on and off cycle of the switching element Sun consists of the on duration tup and off duration toff of the switching element Sun.

FIG. 13A schematically illustrates the amount of charges to be supplied to the capacitor Cu and the motor 10 as an area of the hatching portion.

Therefore, when the area of the hatching portion is matched with the integration of the U-phase command current value iCuc over one on and off cycle of the switching element Sun, an average value of an actual current outputted toward the capacitor Cu and the U-phase winding of the motor 10 over one on and off cycle of the switching element Sun can be determined as the U-phase command current value iCuc.

The determination of the U-phase command current value iCuc set forth above can be achieved by determining the on duration tup as follows.

This matching can be achieved by determining the on duration tup in the following equation [c9] in the same manner as the determination of the on duration tup according to the first embodiment:

$$tup = 2 \cdot L \cdot iCuc \cdot VCu/(Vin-Vin) \qquad [c9]$$

Figure 12D:
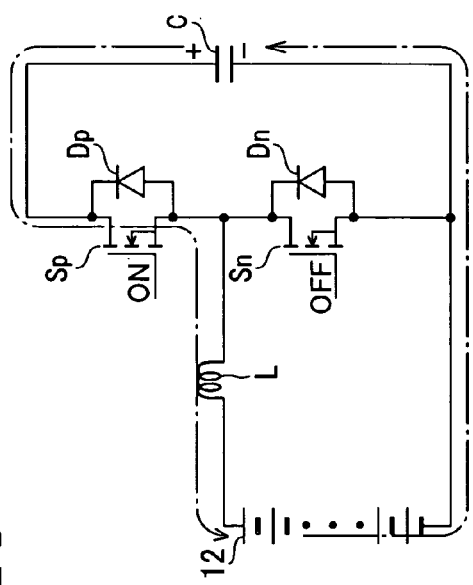
FIG. 12D is a circuit diagram schematically illustrating the chopper control in the first mode upon the drive signal gu2 being off according to the third embodiment.
Figure 13B:
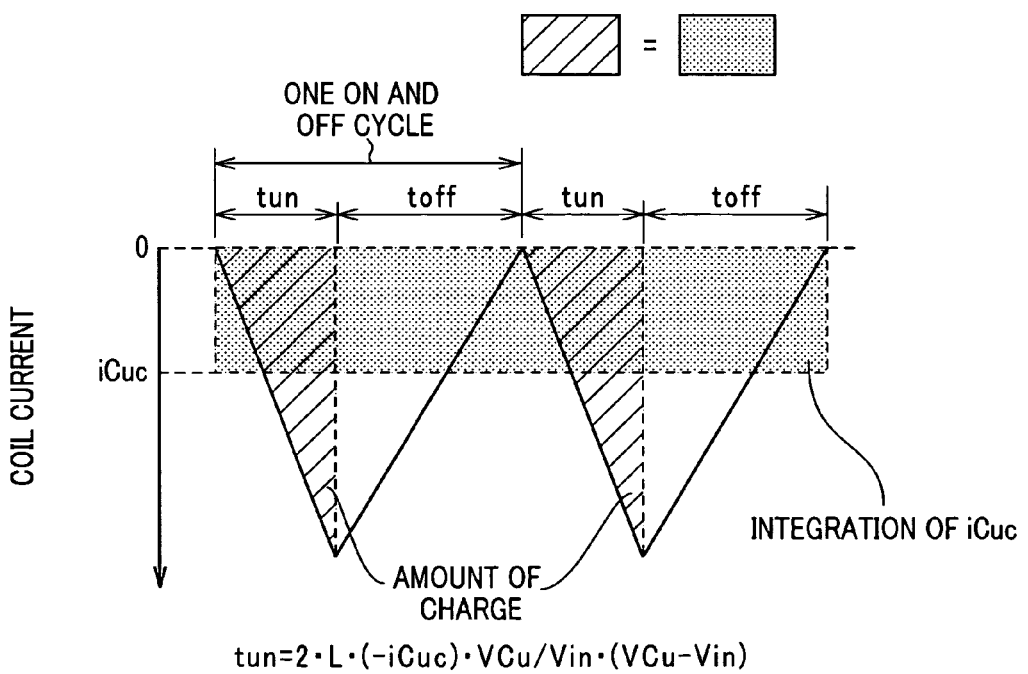
FIG. 13B is a graph schematically illustrating a current flowing through the coil Lu when charges are removed from the capacitor Cu and the motor in the second mode of the chopper control according to the third embodiment.

On the other hand, FIG. 13B schematically illustrates a current flowing through the coil Lu when charges are removed from the capacitor Cu and the motor 10 in the second mode of the chopper control (see FIGS. 12C and 12D). Referring to FIG. 13B, reference character tun represents the on duration of the switching element Sup.

As illustrated in FIG. 13B, when the switching element Sup is turned on, a current flows through the closed, loop circuit illustrated in FIG. 12C, resulting in that the absolute value of the current flowing through the coil Lu gradually increases. Note that, because a direction from the one electrode (positive electrode) of the capacitor Cu to the U-phase winding of the motor 10 is defined to be a positive direction, in FIG. 13B, the current flowing through the coil Lu seems to be gradually reduced below zero.

After the on duration tun has elapsed since the on timing of the switching element Sup, the switching element Sup is turned off. This allows a current to flow through the closed loop circuit illustrated in FIG. 12D, resulting in that the absolute value of the current flowing through the coil Lu gradually decreases. Thereafter, in the third embodiment, when the current through the coil Lu becomes zero, the switching element Sup is switched on again.

Like the first mode, in the second mode, an average value of the current to be outputted through the capacitor Cu and toward the U-phase winding of the motor 10 over a predetermined period is determined as the U-phase command current value iCuc. The predetermined period is set as one on and off cycle of the switching element Sup. One on and off cycle of the switching element Sup consists of the on duration tun and off duration toff of the switching element Sup.

Specifically, the second mode has a purpose of setting an average value of an actual current outputted toward the capacitor Cu and the U-phase winding of the motor 10 over one on and off cycle of the switching element Sup as the U-phase command current value iCuc.

In order to achieve such a purpose, in the second mode, the amount of charges to be removed from the capacitor Cu and the motor 10, illustrated as an area of the hatching portion in FIG. 13B, is matched with the integration of the U-phase command current value iCuc over one on and off cycle of the switching element Sup.

This matching can be achieved by determining the on duration tun in the following equation [c10] in the same manner as the determination of the on duration tup:

$$tun = 2 \cdot L \cdot (-iCuc) \cdot VCu/Vin \cdot (Vcu - Vin) \quad [c10]$$

The equations [c9] and [c10] allow input of the U-phase command current value iCuc, the voltage value Van across the high-voltage battery 12, and the voltage value VCu across the capacitor Cu to the pulse width calculator 72 to calculate the on durations tup and tun by the pulse width calculator 72.

Other structures and operations of the control system CSB according to the third embodiment are identical to those of the control system CA according to the first embodiment.

Thus, the control system CSB according to the third embodiment also achieves the first to eighth effects achieved by the control system CS according to the first embodiment.

Fourth Embodiment

A control system CSC according to the fourth embodiment of the present invention will be described hereinafter with reference to FIGS. 14, 15A to 15D, 16A, and 16B.

The structure of the control system CSC according to the fourth embodiment is substantially identical to that of the control system CS according to the first embodiment except for the following different points. So, like parts between the control systems CS and CSC according to the first and fourth embodiments, to which like reference characters are assigned, are omitted or simplified in description.

Figure 14:
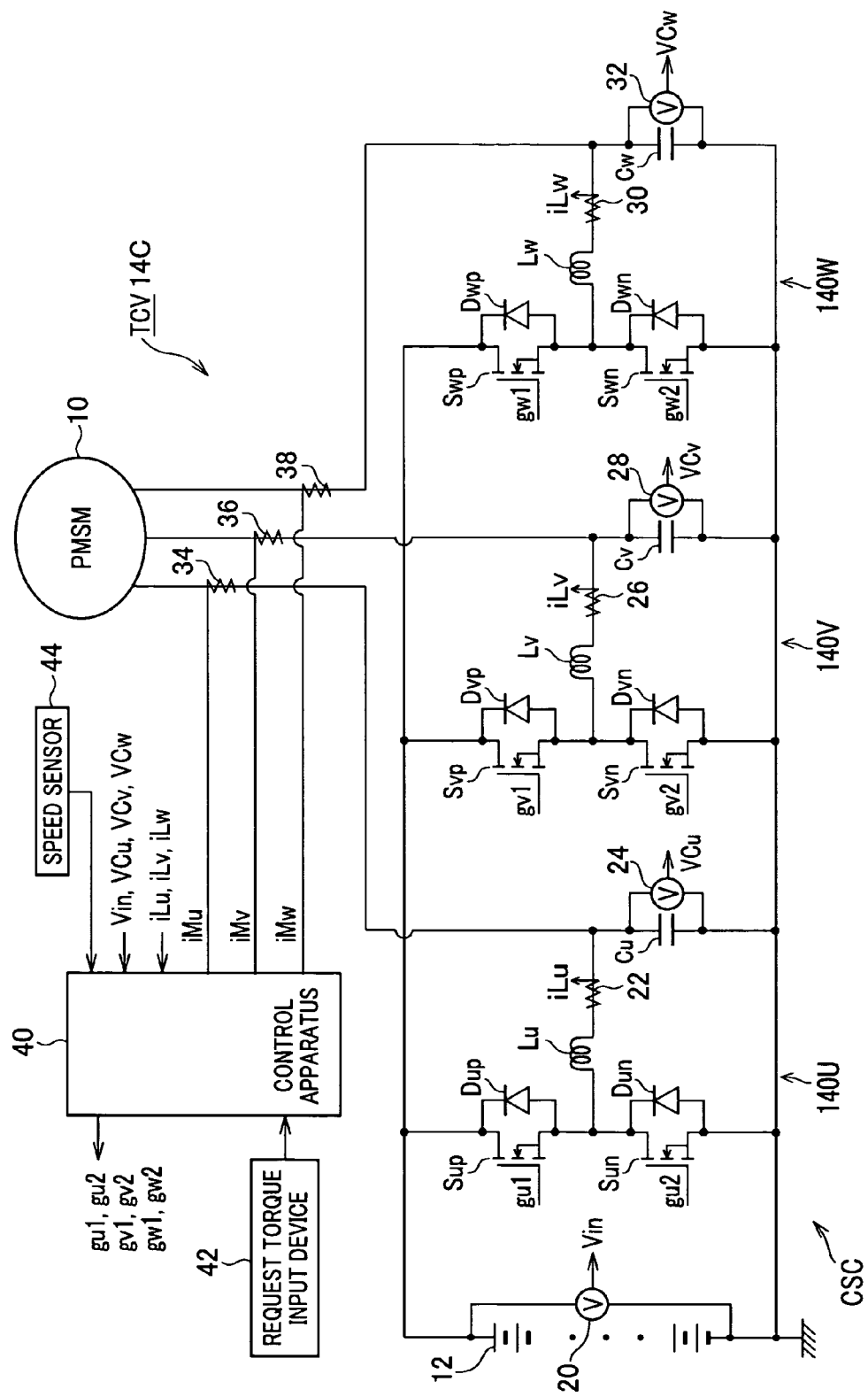
FIG. 14 is a circuit diagram of a control system according to the fourth embodiment of the present invention.

FIG. 14 schematically illustrates an example of the circuit structure of a control system CSC according to the fourth embodiment.

The control system CSC is equipped with a TAD 14C. The TDA 14C is provided with, for example, a back converter 140C for each phase of the motor 10 to be electrically connected to each phase winding of the motor 10.

The back converter 140C for U-phase, referred to as "DC to DC converter 140UC", consists of a capacitor Cu, a set of series-connected switching elements Sup and Sun, and a coil Lu.

The set of series-connected switching elements Sup and Sun is electrically connected in parallel to the high-voltage battery 12. The capacitor Cu is electrically connected between the one terminal of the U-phase winding of the motor 10 and the signal ground.

The coil Lu is arranged to electrically connect a connecting point between the adjacent switching elements Sup and Sun to the connecting point between the one terminal of the U-phase winding of the motor 10 and the capacitor Cu.

The DC to DC converter 140UC includes diodes, such as its intrinsic diodes or alternative diodes, Dup and Dun electrically connected in antiparallel to the switching elements Sup and Sun, respectively.

More specifically, the drain of the switching element Sup is electrically connected to the positive electrode of the high-voltage battery 12. The source of the switching element Sup and the drain of the switching element Sun are commonly connected to each other at the connecting point. The source of the switching element Su2 is electrically connected to the signal ground.

Similarly, the boost converter 140C for V-phase, referred to as "DC to DC converter 140VC", consists of a set of series-connected switching elements Svp and Svn, a capacitor Cv, a coil Lv, and diodes Dvp and Dvn.

In addition, the boost converter HOC for W-phase, referred to as "DC to DC converter 140WC", consists of a set of series-connected switching elements Swp and Swn, a capacitor Cw, and a coil Lw. The circuit configuration of each of the DC to DC converters 140VC and 140WC is identical to that of the DC to DC converter 140UC so that like reference characters refer to like parts in FIG. 14.

In addition, the current sensor 22 is electrically connected in series between the coil Lu and the connecting point between the capacitor Cu and the one terminal of the U-phase winding of the motor 10.

FIGS. 15A to 15D schematically illustrate various modes of the chopper control according to the fourth embodiment.

Note that, in FIGS. 15A to 15D, one of the DC to DC converters constituting the TCV 14C is illustrated, and reference characters from which alpha characters corresponding to any one phase are eliminated are assigned to the elements of one of the DC to DC converters.

For example, switching elements Sup, Svp, and Swp are each represented by common reference character Sp in FIGS. 15A to 15D.

In addition, note that, in FIGS. 15A to 15D, it is assumed that in- and outflow of charges between the capacitor C and the one terminal of a corresponding phase winding of the motor 10 are so low as to be insignificant.

The first mode of the chopper control for supplying charges to the capacitor C and motor 10 will be described hereinafter with reference to FIGS. 15A and 15B.

Figure 15A:
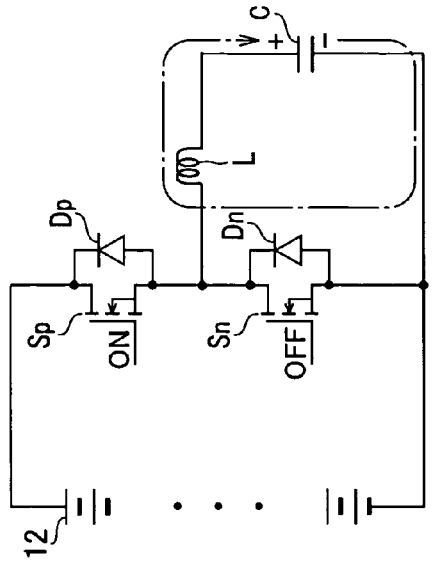
FIG. 15A is a circuit diagram schematically illustrating chopper control in the first mode upon the drive signal ga1 being on according to the fourth embodiment.

When the switching element Sp is switched on in response to the rising of the drive signal gu1, a current flows through a closed loop circuit consisting of the high-voltage battery 12, the switching element Sp, the coil L, and the capacitor C (see the dashed arrow in FIG. 15A). This allows electromagnetic energy to be charged in the coil L, and charges the capacitor C.

Thereafter, when the switching element Sp is switched off in response to the falling of the drive signal gu1, the electromagnetic energy stored in the coil L is discharged therefrom as electrical energy.

Figure 15B:
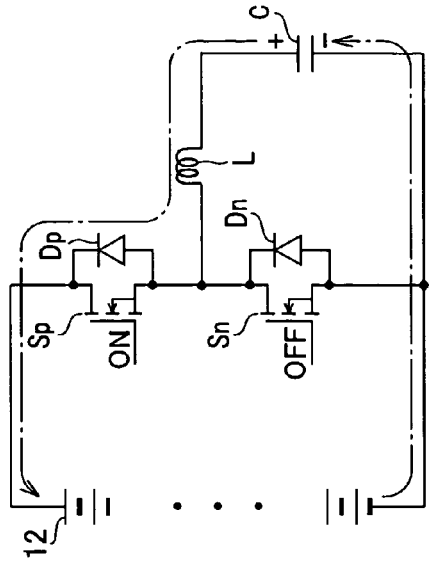
FIG. 15B is a circuit diagram schematically illustrating the chopper control in the first mode upon the drive signal gu1 being off according to the fourth embodiment.

Specifically, a back electromotive force based on the electromagnetic energy stored in the coil L causes a current to flow through a closed loop circuit consisting of the coil L, the capacitor C, and the diode Dn (see the dashed arrow in FIG. 15B). This further charges the capacitor C.

Next, the second mode of the chopper control for removing charges from the capacitor C and motor 10 will be described hereinafter with reference to FIGS. 15C and 15D.

Figure 15C:
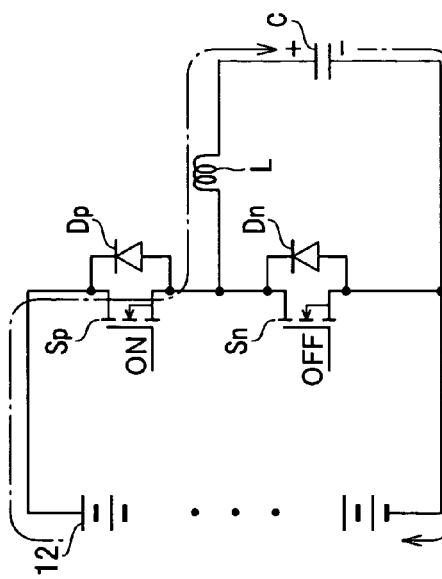
FIG. 15C is a circuit diagram schematically illustrating chopper control in the second mode upon drive signal gu2 being on according to the fourth embodiment.

When the switching element Sn is switched on in response to the rising of the drive signal gu2, the capacitor C discharges to thereby cause a current to flow through a closed loop circuit consisting of the capacitor C, the coil L, and the switching element Sn (see the dashed arrow in FIG. 15C). This removes charges from the capacitor C.

This applies a voltage across the coil L so that electromagnetic energy is charged in the coil L.

Thereafter, when the switching element Sn is switched off in response to the falling of the drive signal gu2, the electromagnetic energy stored in the coil L is discharged therefrom as electrical energy. In other words, a back electromotive force based on the electromagnetic energy stored in the coil L causes a current to flow through a closed loop circuit consisting of the coil L, the diode Dp, the high-voltage battery 12, and the capacitor C.

The chopper control in the first and second modes for each phase of the motor 10 converts the voltage across the DC power source (the high-voltage battery 12) into a desired analog voltage value to thereby output it to a corresponding one of the phase winding of the motor 10. In other words, the chopper control in the first and second modes for each phase of the motor 10 adjusts the voltage across the capacitor C to a desired analog voltage value so that the desired analog voltage is applied to a corresponding one of the phase winding of the motor 10.

Next, operations of the pulse width calculator 72 according to the fourth embodiment will be fully described hereinafter with reference to FIGS. 16A and 16B, Note that operations of the pulse width calculator 84 and those of the pulse width calculator 96 are omitted in description because they are identical to the operations of the pulse width calculator 72.

Figure 16A:
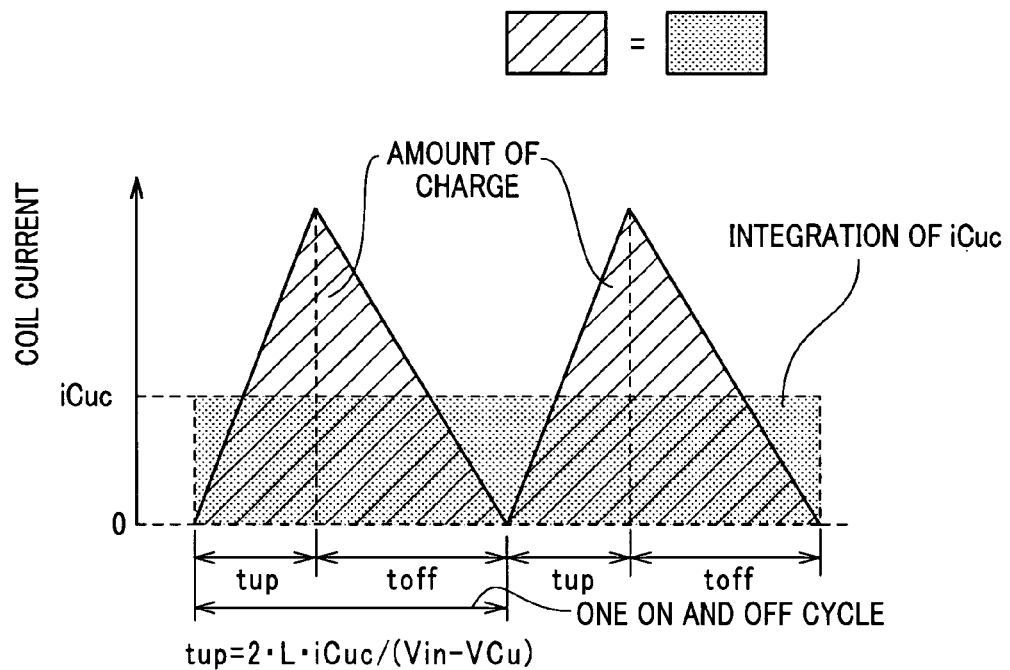
FIG. 16A is a graph schematically illustrating a current flowing through the coil Lu when charges are supplied to the capacitor Cu and the motor 1 in the first mode of the chopper control according to the fourth embodiment.

FIG. 16A schematically illustrates a current flowing through the coil Lu when charges are supplied to the capacitor Cu and the motor 10 in the first mode of the chopper control (see FIGS. 15A and 15B). Referring to FIG. 16A, reference character tup represents the on duration of the switching element Sup.

As illustrated in FIG. 16A, when the switching element Sup is turned on, a current flows through the closed loop circuit illustrated in FIG. 15A, resulting in that the current flowing through the coil Lu gradually increases.

After the on duration tup has elapsed since the on timing of the switching element Sup, the switching element Sup is turned off. This allows a current to flow through the closed loop circuit illustrated in FIG. 15B, resulting in that the current flowing through the coil Lu gradually decreases. Thereafter, in the fourth embodiment, when the current through the coil Lu becomes zero, the switching element Sup is switched on again.

As well as the first embodiment, in the fourth embodiment, an average value of the current to be outputted through the capacitor Cu and toward the U-phase winding of the motor 10 over a predetermined period is determined as the U-phase command current value iCuc. The predetermined period is set as one on and off cycle of each of the switching element Sup. One on and off cycle of the switching element Sun consists of the on duration tup and off duration toff of the switching element Sup.

FIG. 16A schematically illustrates the amount of charges to be supplied to the capacitor Cu and the motor 10 as an area of the hatching portion.

Therefore, when the area of the hatching portion is matched with the integration of the U-phase command current value iCuc over one on and off cycle of the switching element Sun, an average value of an actual current outputted toward the capacitor Cu and the U-phase winding of the motor 10 over one on and off cycle of the switching element Sun can be determined as the U-phase command current value iCuc.

The determination of the U-phase command current value iCuc set forth above can be achieved by determining the on duration tup as follows.

This matching can be achieved by determining the on duration tup in the following equation [c11] in the same manner as the determination of the on duration tup according to the first embodiment:

$$tup = 2 \cdot L \cdot iCuc / (Vin - VCu)$$ [c11]

Figure 15D:
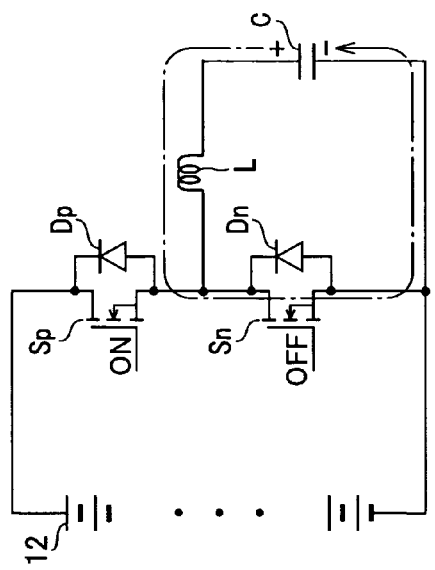
FIG. 15D is a circuit diagram schematically illustrating the chopper control in the first mode upon the drive signal gu2 being off according to the fourth embodiment.
Figure 16B:
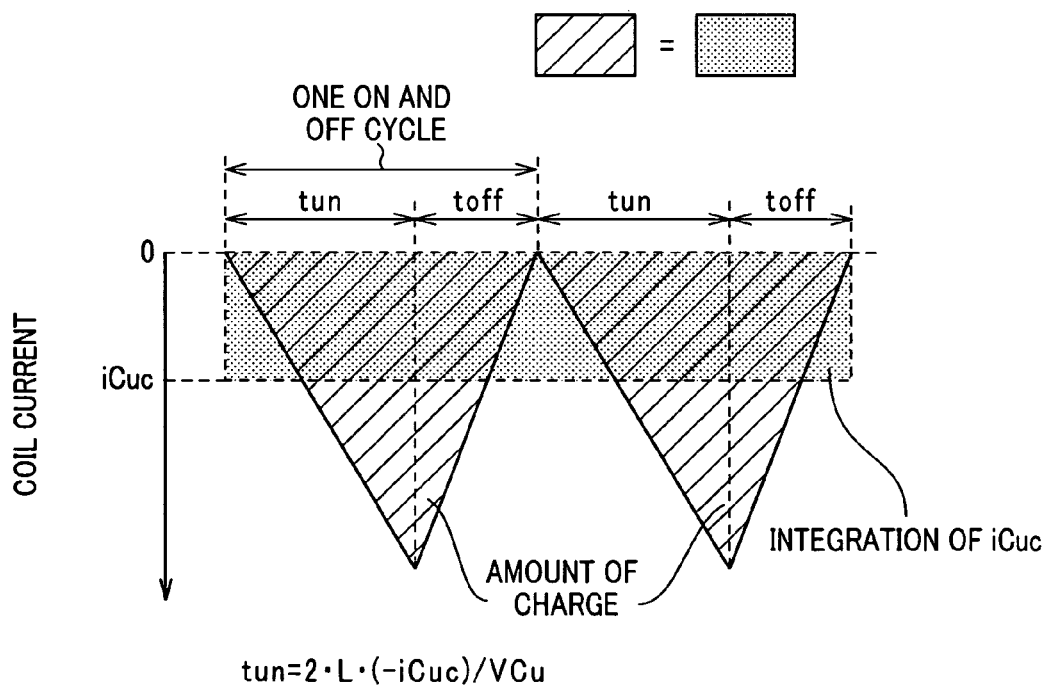
FIG. 16B is a graph schematically illustrating a current flowing through the coil Lu when charges are removed from the capacitor Cu and the motor in the second mode of the chopper control according to the fourth embodiment.

On the other hand, FIG. 16B schematically illustrates a current flowing through the coil Lu when charges are removed from the capacitor Cu and the motor 10 in the second mode of the chopper control (see FIGS. 15C and 15D). Referring to FIG. 16B, reference character tun represents the on duration of the switching element Sun.

As illustrated in FIG. 16B, when the switching element Sun is turned on, a current flows through the closed loop circuit illustrated in FIG. 15C, resulting in that the absolute value of the current flowing through the coil Lu gradually increases. Note that, because a direction from the one electrode (positive electrode) of the capacitor Cu to the U-phase winding of the motor 10 is defined to be a positive direction, in FIG. 15B, the current flowing through the coil Lu seems to be gradually reduced below zero.

After the on duration tun has elapsed since the on timing of the switching element Sun, the switching element Sup is turned off. This allows a current to flow through the closed loop circuit illustrated in FIG. 15D, resulting in that the absolute value of the current flowing through the coil Lu gradually decreases. Thereafter, in the fourth embodiment, when the current through the coil Lu becomes zero, the switching element Sun is switched on again.

Like the first mode, in the second mode, an average value of the current to be outputted through the capacitor Cu and toward the U-phase winding of the motor 10 over a predetermined period is determined as the U-phase command current value iCuc. The predetermined period is set as one on and off cycle of the switching element Sun. One on and off cycle of the switching element Sup consists of the on duration tun and off duration toff of the switching element Sun.

Specifically, the second mode has a purpose of setting an average value of an actual current outputted toward the capacitor Cu and the U-phase winding of the motor 10 over one on and off cycle of the switching element Sup as the U-phase command current value iCuc.

In order to achieve such a purpose, in the second mode, the amount of charges to be removed from the capacitor Cu and the motor 10, illustrated as an area of the hatching portion in FIG. 16B, is matched with the integration of the U-phase command current value iCuc over one on and off cycle of the switching element Sun.

This matching can be achieved by determining the on duration tun in the following equation [c12] in the same manner as the determination of the on duration tup:

$$tun = 2 \cdot L \cdot (-iCuc)/Vcu \quad [c12]$$

The equations [c11] and [c12] allow input of the U-phase command current value iCuc, the voltage value Vin across the high-voltage battery 12, and the voltage value VCu across the capacitor Cu to the pulse width calculator 72 to calculate the on durations tup and tun by the pulse width calculator 72.

Other structures and operations of the control system CSC according to the fourth embodiment are identical to those of the control system CA according to the first embodiment.

Thus, the control system CSC according to the fourth embodiment also achieves the first to eighth effects achieved by the control system CS according to the first embodiment.

Fifth Embodiment

A control system according to the fifth embodiment of the present invention will be described hereinafter with reference to FIGS. 17A and 17B.

The structure of the control system according to the fifth embodiment is substantially identical to that of the control system CSC according to the fourth embodiment. So, like parts between the control systems according to the fourth and fifth embodiments, to which like reference characters are assigned, are omitted or simplified in description.

In the fourth embodiment, the control apparatus 40 is configured to control:

the switching elements Sup and Sun based on: the U-phase command current value iCuc, the voltage value across the capacitor Cu, the voltage value Vin across the high-voltage battery 12, and the current iLu through the coil Lu;

the switching elements Svp and Svn based on: the V-phase command current value iCvc, the voltage value across the capacitor Cv, the voltage value Vin across the high-voltage battery 12, and the current iLv through the coil Lv; and the switching elements Swp and Swn based on: the W-phase command current value iCwc, the voltage value across the capacitor Cw, the voltage value Vin across the high-voltage battery 12, and the current iLw through the coil Lw.

However, the control apparatus 40 according to the fifth embodiment is configured to control:

the switching elements Sup and Sun based on: the U-phase command current value iCuc and the current iLu through the coil Lu;

the switching elements Svp and Svn based on: the V-phase command current value iCvc and the current iLv through the coil Lv; and the switching elements Swp and Swn based on the W-phase command current value iCwc and the current iLw through the coil Lw.

Next, operations of the pulse width calculator 72 according to the fifth embodiment will be fully described hereinafter with reference to FIGS. 17A and 17B. Note that operations of the pulse width calculator 84 and those of the pulse width calculator 96 are omitted in description because they are identical to the operations of the pulse width calculator 72.

Figure 17A:
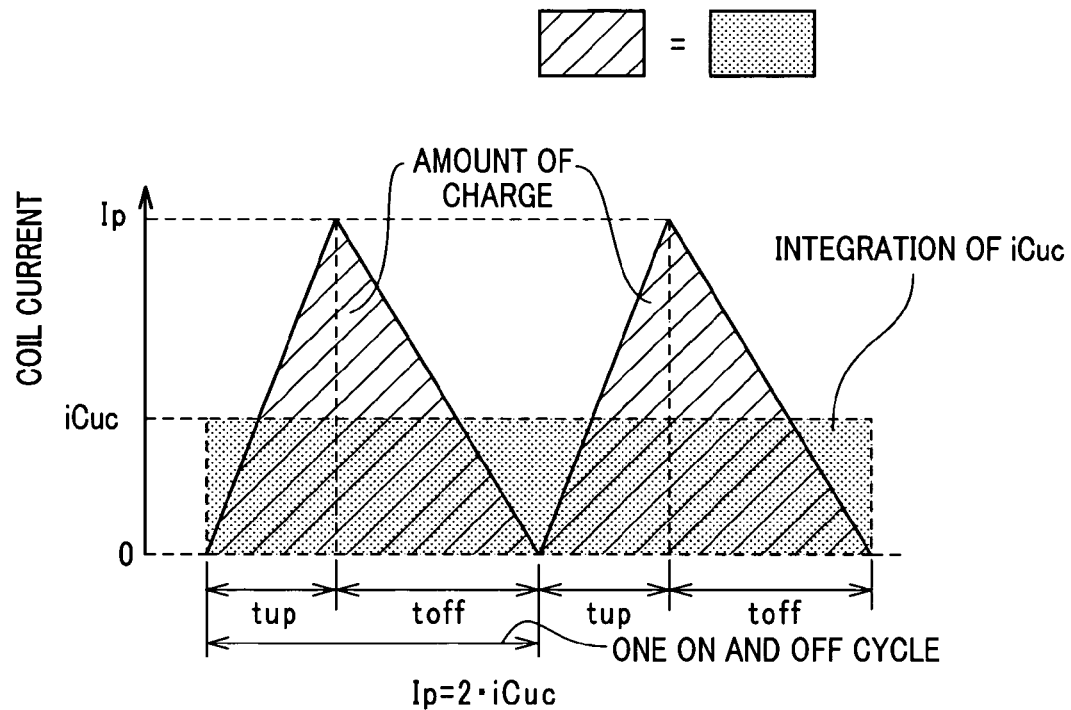
FIG. 17A is a graph schematically illustrating a current flowing through the coil Lu when charges are supplied to the capacitor Cu and the motor in the first mode of the chopper control according to the fifth embodiment.

As illustrated in FIG. 17A, when the absolute value of the current iLu flowing through the coil Lu in the first mode of the chopper control becomes the peak current Ip, the switching elements Sup and Sun are switched from off state to on state.

In addition, when the absolute value of the current iLu flowing through the coil Lu in the first mode of the chopper control becomes zero, the switching elements Sup and Sun are switched from on state to off state.

Figure 17B:
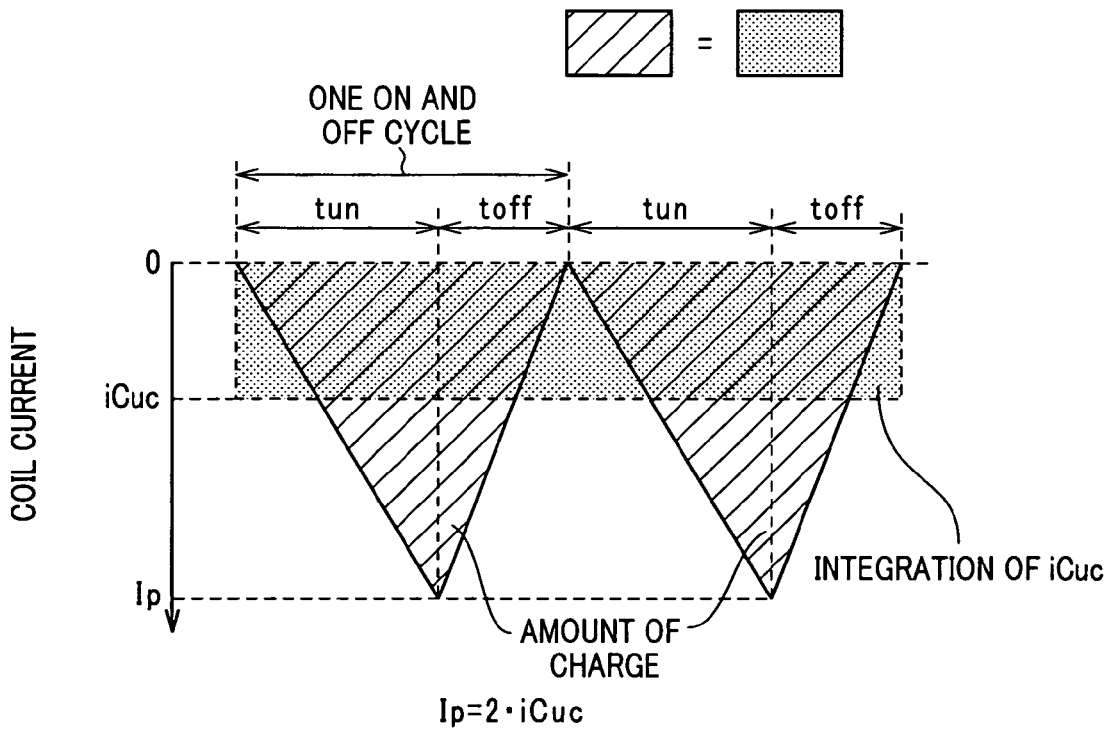
FIG. 17B is a graph schematically illustrating a current flowing through the coil Lu when charges are removed from the capacitor Cu and the motor in the second mode of the chopper control according to the fifth embodiment.

Similarly, as illustrated in FIG. 17B, when the absolute value of the current iLu flowing through the coil Lu in the second mode of the chopper control becomes the peak current Ip, the switching elements Sup and Sun are switched from off state to on state. In addition, when the absolute value of the current iLu flowing through the coil Lu in the second mode of the chopper control becomes zero, the switching elements Sup and Sun are switched from on state to off state.

In addition, the peak current Ip is set to be twice the U-phase command current value iCuc.

This allows the amount of charges (the area of the hatching portion) to the capacitor Cu and the motor 10 over one on and off cycle of each of the switching element Sup and Sun to be identical to an integrated value of the U-phase command current value iCuc over the same on and off cycle of a corresponding one of the switching element Sup and Sun while reducing the number of input signals to be used to the chopper control.

In each of the aforementioned embodiments, the corresponding control system is configured to switch corresponding at least one of the switching elements Sp1, Sp2, Sn1, Sn2, Sp, Sn, S1, and S2 from off state to on state when the current through the corresponding coil L (Lu, Lv, Lw) becomes zero, but the present invention is not limited thereto.

Specifically, the control systems according to the first to fifth embodiment can be configured to switch corresponding at least one of the switching elements Sp1, Sp2, Sn1, Sn2, Sp, Sn, S1, and S2 from off state to on state when the current through the corresponding coil L (Lu, Lv, Lw) decreases up to a preset current value.

In this modification, the control systems according to the first to fourth embodiments can calculate the on durations tup and tnn in the same manner as the first to fourth embodiments. The modified control system according to the fifth embodiment can set the subtraction of the present current value from the peak current Ip to be twice each of the three-phase command current values iCuc, iCvc, iCwc.

In each of the first to fifth embodiments, the feedback controllers 68, 80, and 92 use the proportional feedback algorithm to carry out feedback control of the actually measured three-phase voltage values VCu, VCv, and VCw across the respective capacitors Cu, Cv, and Cw. The present invention is however not limited thereto.

Specifically, the feedback controllers 68, 80, and 92 can use a proportional integral feedback algorithm or a proportional-integral-derivative feedback algorithm to carry out feedback control of the actually measured voltage values VCu, VCv, and VCw across the respective capacitors Cu, Cv, and Cw.

In each of the first to fifth embodiments, in order to fix the polarity of the voltage across each of the capacitors Cu, Cv, and Cw, each of the U-, V-, and W-phase command voltages Vuc, Vuc, and Vwc is corrected based on a corresponding offset voltage Δ. This increases or decreases the difference ΔV between each of the U-, V-, and W-phase command voltages Vuc, Vvc, and Vwc and a corresponding one of the capacitor voltage values VCu, VCv, and VCw. The present invention is however not limited to such offset correction.

Specifically, before calculating the difference ΔV, the control system can correct each of the capacitor voltage values VCu, VCv, and VCw based on an inverted offset voltage —Δ whose polarity is reversed from the offset voltage Δ. In addition, after calculating the difference ΔV, the control system can add the offset voltage Δ to the calculated difference ΔV.

In each of the first to fifth embodiments, each of the three-phase command current value iCuc, iCvc, and iCwc is calculated based on the deviation between a corresponding one of the three-phase command voltages Vuc' Vvc', and Vwc' and a corresponding one of the capacitor voltage values VCu, VCv, and VCw. The present invention is however not limited to such feedback control method.

Specifically, each of the three-phase command current value iCuc, iCvc, and iCwc can be calculated based on the change in the variable of a corresponding one of the three-phase command voltages Vuc' Vuc', and Vwc' in view of the fact that each of the three-phase command voltages Vuc' Vvc', and Vwc' is associated with charges required for a corresponding one of the capacitors Cu, Cv, and Cw.

In this modification, by considering the three-phase current values iMu, iMv, and iMw of the three-phase windings of the motor 10 actually measured by the current sensors 34, 36, and 38, the control system can properly calculate the three-phase command current value iCuc, iCvc, and iCwc even if the power factor of the motor 10 as set to be variable during control of the motor 10.

As such open loop control according to this modification, feedforward control can be used. The feedforward control is configured to:

calculate the voltage values across the respective capacitors Cu, Cv, and Cw based on the capacitances of the capacitors Cu, Cv, and Cw and either the actually measured three-phase current values iMu, iMv, and iMw or previous three-phase command current value iCuc, iCvc, and iCwc, and control the calculated voltage values across the respective capacitors Cu, Cv, and Cw so that they are matched with the three-phase command voltages Vuc' Vvc', and Vwc'.

In addition, such a feedforward control method and a suitable feedback control method described in the aforementioned embodiments for feedback correction of the result of the feedforward control method can be utilized to calculate the three-phase command current value iCuc, iCvc, and iCwc.

As the currents through the respective capacitors Cu, Cv, and Cw, the three-phase current values iMu, iMv, and iMw are used, but three-phase command current components into which the command d-axis and q-axis current components idc and iqc have been converted can be used.

In each of the first to fifth embodiments, the current sensors 22, 24, and 26 are provided to measure a current through a corresponding phase winding of the motor 10, but the present invention it not limited thereto.

Specifically, it is possible to calculate a current through each phase winding of the motor 10 based on the voltage value across a corresponding one of the capacitors Cu, Cv, and Cw and the voltage value Vin across the high-voltage battery 12.

The three-phase command voltage Vuc, Vvc, and Vwc are calculated based on the command d-axis and q-axis current components idc and iqc, but the present invention is not limited thereto.

Specifically, when the motor 10 is controlled such that an actual rotational speed of the motor 10 is matched with a command rotational speed, the three-phase command voltage Vuc, Vvc, and Vwc can be calculated based on the deviation of the actual rotational speed of the motor 10 from the command rotational speed.

In each of the first to fourth embodiments, the voltage sensors 24, 28 and 32 are provided to measure a voltage value across a corresponding one of the capacitors Cu, Cv, and Cw, but the present invention it not limited thereto.

Specifically, it is possible to calculate a voltage value across each of the capacitors Cu, Cv, and Cw based on the rate of change in the current measured by a corresponding one of the current sensors 22, 26, and 30.

The three-phase command current value iCuc, iCvc, and iCwc are configured to be calculated based on the three-phase command voltages Vuc, Vvc, and Vwc with the use of, as a parameter, the current actually flowing through each of the U, V-, and W-phase winding of the motor 10. The present invention is however not limited to the configuration.

Specifically, if the motor 10 is controlled with its power factor being fixed, the three-phase command current value iCuc, iCvc, and iCwc can be calculated based on the three-phase command voltages Vuc, Vvc, and Vwc without using, as direct parameters, the current actually flowing through each of the U-, V, and W-phase winding of the motor 10. This is because, when the motor 10 is controlled with its power factor being fixed, each of the command voltages Vuc, Vvc, and Vwc includes information of phase of a current flowing through a corresponding phase winding of the motor 10.

The chopper control can be carried out based on the three-phase command current value iCuc, iCvc, and iCwc. This properly adjusts charges in each of the capacitors Cu, Cv, and Cw in comparison with the method for directly feeding back the voltage value across each of the capacitors Cu, Cv, and Cw to a corresponding one of the command voltages Vuc, Vvc, and Vwc.

In each of the first to fifth embodiments, in order to control the voltage across each of the capacitors Cu, Cv, and Cw based on a corresponding one of the command voltages Vuc, Vvc, and Vwc, the control system is designed to carry out chopper control of the TCV while grasping the amount of charges to be inputted and outputted between the TCV and the motor 10. The present invention is however not limited to the design.

Specifically, according to the operations illustrated in FIG. 3, using, as parameters, the command voltages Vuc, Vvc, and Vwc and/or the actually measured three-phase current values iMu, iMv, and iMw allows calculation of chopper-control parameters, such as the on durations tup and tun, required to determine how the chopper control is carried out. Thus, a map representing a relationship between an output parameter of each of the chopper-control parameters for each phase and an input parameter of a corresponding one of the command voltages Vuc, Vuc, and Vwc and/or the actually measured three-phase current values iMu, iMv, and iMw can be provided.

Specifically, when a value of the input parameter is inputted, the control system can determine a value of each of the output parameters; this value of each of the output parameters corresponds to the value of the input parameter in the map.

The actual rotational speed ω can be estimated based on an actual d-axis current and an actual q-axis current without using the rotational speed sensor 44.

The TCV according to each of the first to fifth embodiments can be modified in structure. Specifically, referring to FIG. 1 as an example, a capacitor can be provided in parallel to each of the switching elements Sun1, Sun2, Svn1, Svn2, Swn1, and Swn2. This modification reduces power low during each of the switching elements Sun1, Sun2, Svn1, Svn2, Swn1, and Swn2 being off.

The TCV is provided with a non-insulated converter electrically connected to each phase winding of the motor 10, but can be provided with an insulated converter electrically connected thereto.

In each of the first to fifth embodiments, the three-phase motor 10 is used as an example of rotary machines. For example, various rotary machines, such as a single-phase motor, five-phase motor, a single-phase generator, or multiphase generator, can be used. In this modification, a DC to DC converter described in any one of the first to fifth embodiments for each phase winding of one of the rotary machines can be provided.

In each of the first to fifth embodiments, the TCV is electrically connected to the rotary machine serving as a power generator for a hybrid vehicle, but can be electrically connected to a rotary machine for an electric motor vehicle, or a motor installed in an air conditioner.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. A control apparatus for driving a power converter having: a power supply unit, a switching member electrically connected to the power supply unit, and a power accumulator electrically connected to the switching member to thereby control a rotary machine with a terminal electrically connected to the power accumulator, the control apparatus comprising:
    a calculator configured to calculate, as a command value for an output current to the power accumulator and the rotary machine, the sum of a current value calculated based on a command voltage to the rotary machine and a current flowing through the terminal of the rotary machine; and
    a chopper control unit configured to carry out chopper control of the power converter by switching on and off the switching member to thereby convert a voltage across the power accumulator into a desired voltage relative to a voltage of the power supply unit, and to bring the output current to the power accumulator and the rotary machine to the command value calculated by the calculator.

2. The control apparatus according to claim 1, wherein the calculator is configured to calculate the command value for the output current to the power accumulator and the rotary machine based on a deviation between the voltage across the power accumulator and the command voltage to the rotary machine.

3. The control apparatus according to claim 1, wherein the command voltage to the rotary machine is an alternating current signal, and the calculator is configured to shift the deviation between the voltage across the power accumulator and the command voltage to the rotary machine so as to maintain unchanged a polarity of the voltage of the power accumulator.

4. The control apparatus according to claim 1, wherein the chopper control unit is configured to change a mode of the chopper control to thereby match, with the command value of the output current, an average value of the output current to the power accumulator and the rotary machine over a predetermined period.

5. The control apparatus according to claim 4, wherein the power converter is provided with a coil electrically connected to the switching member and to the power accumulator, the chopper control unit is configured to:
    cyclically carry out a set of: a first process to gradually increase a current through the coil and a second process to gradually decrease the current through the coil; and
    determine the mode of the chopper control such that the average value of the output current to the power accumulator over an one cycle of the set of the first and second processes is matched with the command value of the output current, the one cycle of the set of the first and second processes corresponding to the predetermined period.

6. The control apparatus according to claim 4, wherein the chopper control unit is configured to:
    cyclically switch on and off the switching member so as to carry out the chopper control of the power converter; and
    determine, as the mode of the chopper control, one cycle of the on and off of the switching member such that the average value of the output current to the power accumulator over the one cycle of the on and off of the switching member is matched with the command value of the output current, the one cycle of the on and off of the switching member corresponding to the predetermined period.

7. The control apparatus according to claim 1, wherein the power converter is provided with a coil electrically connected to the switching member and to the power accumulator, the chopper control unit is configured to:
    variably determine an on duration of the switching member to thereby change the switching member from on state to off state when an amount of current through the coil becomes zero.

8. The control apparatus according to claim 1, wherein the chopper control unit is configured to carry out the chopper control while considering the voltage across the power accumulator and the voltage of the power supply unit.

9. The control apparatus according to claim 1, wherein the power converter is provided with a coil electrically connected to the switching member and to the power accumulator, and the chopper control unit is configured to carry out the chopper control while considering a current flowing through the coil.

10. A control apparatus for driving a power converter having: a power supply unit, a switching member electrically connected to the power supply unit, and a power accumulator electrically connected to the switching member to thereby control a rotary machine with a terminal electrically connected to the power accumulator, the control apparatus comprising:
    a grasping unit configured to grasp an amount of charges to be transferred between the rotary machine and the power converter; and
    a chopper control unit configured to determine whether to supply charges to the rotary machine and the power converter or remove charges from the rotary machine and the power converter based on the grasped amount of charges, and carry out, based on a result of the determination, chopper control of the power converter by switching on and off the switching member to thereby control a voltage across the power accumulator relative to a voltage of the power supply unit according to the command voltage for the rotary machine.

11. The control apparatus according to claim 10, further comprising a calculator configured to calculate, based on the command voltage to the rotary machine, a command value for an output current to the power accumulator and the rotary machine,
    wherein the chopper control unit is configured to carry out the chopper control of the power converter by switching on and off the switching member based on the command value for the output current to the power accumulator and the rotary machine and the grasped amount of charges.

12. The control apparatus according to claim 11, wherein the calculator is configured to calculate the command value for the output current to the power accumulator and the rotary machine based on a deviation between the voltage across the power accumulator and the command voltage to the rotary machine.

13. The control apparatus according to claim 11, wherein the command voltage to the rotary machine is an alternating current signal, and the calculator is configured to shift the deviation between the voltage across the power accumulator and the command voltage to the rotary machine so as to maintain unchanged a polarity of the voltage of the power accumulator.

14. The control apparatus according to claim 11, wherein the chopper control unit is configured to change a mode of the chopper control to thereby match, with the command value of the output current, an average value of the output current to the power accumulator and the rotary machine over a predetermined period.

15. The control apparatus according to claim 14, wherein the power converter is provided with a coil electrically connected to the switching member and to the power accumulator, the chopper control unit is configured to:
cyclically carry out a set of: a first process to gradually increase a current through the coil and a second process to gradually decrease the current through the coil; and
determine the mode of the chopper control such that the average value of the output current to the power accumulator over an one cycle of the set of the first and second processes is matched with the command value of the output current, the one cycle of the set of the first and second processes corresponding to the predetermined period.

16. The control apparatus according to claim 14, wherein the chopper control unit is configured to:
cyclically switch on and off the switching member so as to carry out the chopper control of the power converter; and
determine, as the mode of the chopper control, one cycle of the on and off of the switching member such that the average value of the output current to the power accumulator over the one cycle of the on and off of the switching member is matched with the command value of the output current, the one cycle of the on and off of the switching member corresponding to the predetermined period.

17. The control apparatus according to claim 11, wherein the power converter is provided with a coil electrically connected to the switching member and to the power accumulator, the chopper control unit is configured to:
variably determine an on duration of the switching member to thereby change the switching member from on state to off state when an amount of current through the coil becomes zero.

18. The control apparatus according to claim 11, wherein the chopper control unit is configured to carry out the chopper control while considering the voltage across the power accumulator and the voltage of the power supply unit.

19. The control apparatus according to claim 11, wherein the power converter is provided with a coil electrically connected to the switching member and to the power accumulator, and the chopper control unit is configured to carry out the chopper control while considering a current flowing through the coil.

20. The control apparatus according to claim 1, wherein the power converter is made up of a non-insulated converter.

21. The control apparatus according to claim 20, the non-insulated converter includes any one of:

a back converter comprising:
a pair of switching elements as the switching member electrically connected in parallel to the power supply unit, one of the pair of switching elements being electrically connected to the other of the pair of switching elements at a connecting point; and
a coil arranged to electrically connect the connecting point of the pair of switching elements to the power accumulator, a boost converter comprising:
a pair of switching elements as the switching member electrically connected in parallel to the power accumulator, one of the pair of switching elements being electrically connected to the other of the pair of switching elements at a connecting point; and
a coil arranged to electrically connect the connecting point of the pair of switching elements to the power supply unit, a first back boost converter comprising:
a pair of switching elements as the switching member electrically connecting one output terminal of the power accumulator and one output terminal of the power supply unit, one of the pair of switching elements being electrically connected to the other of the pair of switching elements at a connecting point; and
a coil arranged to electrically connect the connecting point of the pair of switching elements to the other terminal of the power accumulator and the other terminal of the power supply unit, and a second back boost converter comprising;
a first pair of switching elements as the switching member electrically connected in parallel to the power supply unit, one of the first pair of switching elements being electrically connected to the other of the first pair of switching elements at a first connecting point;
a second pair of switching elements as the switching member electrically connected in parallel to the power accumulator, one of the second pair of switching elements being electrically connected to the other of the second pair of switching elements at a second connecting point; and
a coil arranged to electrically connect the first connecting point of the first pair of switching elements to the second connecting point of the second pair of switching elements.

22. The control apparatus according to claim 10, wherein the power converter comprises a non-insulated converter.

23. The control apparatus according to claim 22, the non-insulated converter includes any one of:

a back converter comprising:
a pair of switching elements as the switching member electrically connected in parallel to the power supply unit, one of the pair of switching elements being electrically connected to the other of the pair of switching elements at a connecting point; and
a coil arranged to electrically connect the connecting point of the pair of switching elements to the power accumulator, a boost converter comprising:
a pair of switching elements as the switching member electrically connected in parallel to the power accumulator, one of the pair of switching elements being electrically connected to the other of the pair of switching elements at a connecting point; and
a coil arranged to electrically connect the connecting point of the pair of switching elements to the power supply unit, a first back boost converter comprising:
- a pair of switching elements as the switching member electrically connecting one output terminal of the power accumulator and one output terminal of the power supply unit, one of the pair of switching elements being electrically connected to the other of the pair of switching elements at a connecting point; and
- a coil arranged to electrically connect the connecting point of the pair of switching elements to the other terminal of the power accumulator and the other terminal of the power supply unit, and a second back boost converter comprising:
- a first pair of switching elements as the switching member electrically connected in parallel to the power supply unit, one of the first pair of switching elements being electrically connected to the other of the first pair of switching elements at a first connecting point;
- a second pair of switching elements as the switching member electrically connected in parallel to the power accumulator, one of the second pair of switching elements being electrically connected to the other of the second pair of switching elements at a second connecting point; and
- a coil arranged to electrically connect the first connecting point of the first pair of switching elements to the second connecting point of the second pair of switching elements.

24. A control system comprising:
- a power converter comprising: a power supply unit, a switching member electrically connected to the power supply unit, and a power accumulator electrically connected to the switching member; and
- a control apparatus for driving the power converter to thereby control a rotary machine with a terminal electrically connected to the power accumulator, the control apparatus comprising:
- a calculator configured to calculate, as a command value for an output current to the power accumulator and the rotary machine, the sum of a current value calculated based on a command voltage to the rotary machine and a current flowing through the terminal of the rotary machine; and
- a chopper control unit configured to carry out chopper control of the power converter by switching on and off the switching member to thereby convert a voltage across the power accumulator into a desired voltage relative to a voltage of the power supply unit, and to bring the output current to the power accumulator and the rotary machine to the command value calculated by the calculator.

25. A control system comprising:
- a power converter comprising: a power supply unit, a switching member electrically connected to the power supply unit, and a power accumulator electrically connected to the switching member; and
- a control apparatus for driving the power converter to thereby control a rotary machine with a terminal electrically connected to the power accumulator, the control apparatus comprising:
- a grasping unit configured to grasp an amount of charges to be transferred between the rotary machine and the power converter; and
- a chopper control unit configured to determine whether to supply charges to the rotary machine and the power converter or remove charges from the rotary machine and the power converter based on the grasped amount of charges, and carry out, based on a result of the determination, chopper control of the power converter by switching on and off the switching member to thereby control a voltage across the power accumulator relative to a voltage of the power supply unit according to the command voltage for the rotary machine.

* * * * *